US011632794B2

(12) United States Patent
Tsai et al.

(10) Patent No.: US 11,632,794 B2
(45) Date of Patent: Apr. 18, 2023

(54) METHODS AND APPARATUSES FOR LISTEN BEFORE TALK FAILURE DETECTION AND RECOVERY

(71) Applicant: FG Innovation Company Limited, Tuen Mun (HK)

(72) Inventors: Hsin-Hsi Tsai, Taipei (TW); Heng-Li Chin, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/095,683

(22) Filed: Nov. 11, 2020

(65) Prior Publication Data
US 2021/0144762 A1    May 13, 2021

Related U.S. Application Data

(60) Provisional application No. 62/934,676, filed on Nov. 13, 2019.

(51) Int. Cl.
*H04W 74/08* (2009.01)
*H04L 5/00* (2006.01)
(Continued)

(52) U.S. Cl.
CPC ......... *H04W 74/0808* (2013.01); *H04L 5/001* (2013.01); *H04L 5/0098* (2013.01); *H04W 72/21* (2023.01); *H04W 74/0833* (2013.01)

(58) Field of Classification Search
CPC ......... H04W 74/0808; H04W 72/1284; H04W 74/0833; H04L 5/001; H04L 5/0098
(Continued)

(56) References Cited

U.S. PATENT DOCUMENTS

2021/0100031 A1\* 4/2021 Cirik ..................... H04W 76/19
2021/0144760 A1\* 5/2021 Ozturk ................ H04W 74/008

FOREIGN PATENT DOCUMENTS

CN      108476532 A     8/2018
WO   2019/195465 A1   10/2019
(Continued)

OTHER PUBLICATIONS 62932321P (Year: 2019).\*
(Continued)

*Primary Examiner* — Yemane Mesfin
*Assistant Examiner* — Intekhaab A Siddiquee
(74) *Attorney, Agent, or Firm* — ScienBiziP, P.C.

(57) ABSTRACT

A method performed by a UE for Listen Before Talk (LBT) failure detection and recovery includes the UE triggering a first consistent LBT failure procedure for a first consistent LBT failure detected on a first Bandwidth Part (BWP) of a first cell of a Base Station (BS); triggering a second consistent LBT failure procedure for a second consistent LBT failure detected on a second BWP of a second cell of the BS; triggering a first Scheduling Request (SR) procedure for the first consistent LBT failure; triggering a second SR procedure for the second consistent LBT failure; receiving, from the BS, an indication for BWP switching of the first cell; switching an active BWP of the first cell based on the indication; canceling the first consistent LBT failure procedure in response to receiving the indication; and canceling the first SR procedure in response to receiving the indication.

20 Claims, 11 Drawing Sheets

(51) Int. Cl.
*H04W 72/12* (2009.01)
*H04W 72/21* (2023.01)

(58) Field of Classification Search
USPC ........................................................ 370/329
See application file for complete search history.

(56) References Cited

FOREIGN PATENT DOCUMENTS

WO       2019/195563 A1    10/2019
WO       WO-2021067354 A1 *  4/2021   ........ H04W 72/1278

OTHER PUBLICATIONS 62908473P (Year: 2019).*
R2-1912889, "Handling UL LBT Failures in MAC", 3GPP RAN WG2 Meeting #107bis, Chongqing, China, Oct. 14-18, 2019 (Year: 2019).*
Interdigital, "Handling UL LBT Failures in MAC", R2-1912889, 3GPP RAN WG2 Meeting #107bis, Chongqing, China, Oct. 14-18, 2019.
Huawei et al., "Handling of UL LBT failure", R2-1915141, 3GPP TSG-RAN WG2 Meeting 108, Reno, USA, Nov. 18-22, 2019.

3GPP TR 38.889, "3rd Generation Partnership Project; Technical Specification Group Radio Access Network; Study on NR-based access to unlicensed spectrum (Release 16)", V16.0.0 (Dec. 2018).
3GPP TS 38.321, "3rd Generation Partnership Project; Technical Specification Group Radio Access Network; NR; Medium Access Control (MAC) protocol specification (Release 15)", V15.7.0 (Sep. 2019).
3GPP TS 38.331, "3rd Generation Partnership Project; Technical Specification Group Radio Access Network; NR; Radio Resource Control (RRC) protocol specification (Release 15)", V15.7.0 (Sep. 2019).
3GPP TS 38.300, "3rd Generation Partnership Project; Technical Specification Group Radio Access Network; NR; NR and NG-RAN Overall Description; Stage 2 (Release 15)", V15.7.0 (Sep. 2019).
3GPP TS 37.340, "3rd Generation Partnership Project; Technical Specification Group Radio Access Network; Evolved Universal Terrestrial Radio Access (E-UTRA) and NR; Multi-connectivity; Stage 2 (Release 15)", V15.7.0 (Sep. 2019).
3GPP TS 38.213, "3rd Generation Partnership Project; Technical Specification Group Radio Access Network; NR; Physical layer procedures for control (Release 15)", V15.7.0 (Sep. 2019).
3GPP TS 38.212, "3rd Generation Partnership Project; Technical Specification Group Radio Access Network; NR; Multiplexing and channel coding (Release 15)", V15.7.0 (Sep. 2019).

* cited by examiner

METHODS AND APPARATUSES FOR LISTEN BEFORE TALK FAILURE DETECTION AND RECOVERY

CROSS-REFERENCE TO RELATED APPLICATION(S)

The present disclosure claims the benefit of and priority to provisional U.S. Patent Application Ser. No. 62/934,676 ("the '676 provisional"), filed on Nov. 13, 2019, entitled "Method and apparatus for LBT failure detection and recovery procedure." The content(s) of the '676 provisional are fully incorporated herein by reference for all purposes.

FIELD

The present disclosure is generally related to wireless communications, and more specifically, to methods and apparatuses for Listen Before Talk (LBT) detection and recovery.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to methods and apparatuses for LBT detection and recovery.

According to an aspect of the present disclosure, a method performed by a UE for LBT failure detection and recovery is provided. The method includes the UE triggering a first consistent LBT failure procedure for a first consistent LBT failure detected on a first Bandwidth Part (BWP) of a first cell of a Base Station (BS); triggering a second consistent LBT failure procedure for a second consistent LBT failure detected on a second BWP of a second cell of the BS; triggering a first Scheduling Request (SR) procedure for the first consistent LBT failure; triggering a second SR procedure for the second consistent LBT failure; receiving, from the BS, an indication for BWP switching of the first cell; switching an active BWP of the first cell based on the indication; canceling the first consistent LBT failure procedure, without canceling the second consistent LBT failure procedure, in response to receiving the indication; and canceling the first SR procedure, without canceling the second SR procedure, in response to receiving the indication.

According to another aspect of the present disclosure, a UE for LBT failure detection and recovery is provided. The UE includes a memory and at least one processor coupled to the memory. The at least one processor is configured to trigger a first consistent LBT failure procedure for a first consistent LBT failure detected on a first Bandwidth Part (BWP) of a first cell of a BS; a second consistent LBT failure procedure for a second consistent LBT failure detected on a second BWP of a second cell of the BS; trigger a first SR procedure for the first consistent LBT failure; trigger a second SR procedure for the second consistent LBT failure; receive, from the BS, an indication for BWP switching of the first cell; switch an active BWP of the first cell based on the indication; cancel the first consistent LBT failure procedure, without canceling the second consistent LBT failure procedure, in response to receiving the indication; and cancel the first SR procedure, without canceling the second SR procedure, in response to receiving the indication.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
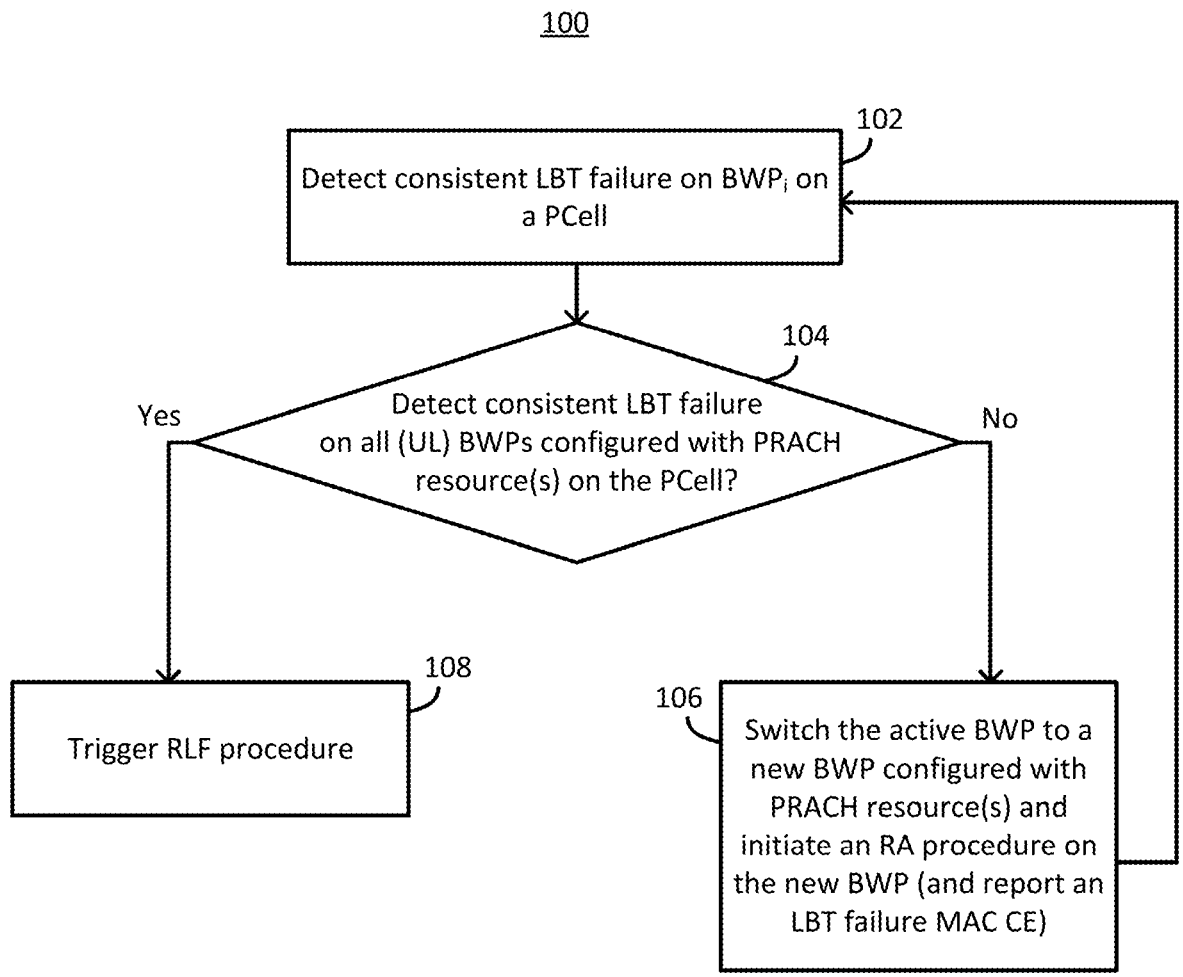
FIG. 1 illustrates a flowchart for an LBT failure detection and recovery procedure for a Primary Cell (PCell), in accordance with an implementation of the present disclosure.

The acronyms in the present disclosure are defined as follows. Unless otherwise specified, the acronyms have the following meanings.

| Acronym | Full name |
|---|---|
| ASN.1 | Abstract Syntax Notation One |
| 3GPP | 3rd Generation Partnership Project |
| 5G | 5th Generation |
| 5GC | 5th Generation Core |
| ACK | Acknowledgment |
| BFR | Beam Failure Recovery |
| BSR | Buffer Status Report |
| BWP | Band Width Part |
| CBRA | Contention Based Random Access |
| CC | Component Carrier |
| CE | Control Element |
| CG | Cell Group |
| COT | Channel Occupancy Time |
| CSI | Channel State Information |
| DC | Dual Connectivity |
| DCI | Downlink Control Information |
| DL | Downlink |
| D-SR | Dedicated Scheduling Request |
| E-UTRAN | Evolved Universal Terrestrial Radio Access Network |
| EPC | Evolved Packet Core |
| HARQ | Hybrid Automatic Repeat Request |
| ID | Identity |
| IE | Information Element |
| LAA | Licensed Assisted Access |
| LBT | Listen Before Talk |
| LCH | Logical Channel |
| LTE | Long Term Evolution |
| MAC | Medium Access Control |
| MCG | Master Cell Group |
| MCOT | Maximum Channel Occupancy Time |
| MIMO | Multi-input Multi-output |
| MN | Master Node |
| NR | New RAT / New Radio |
| NR-U | New Radio Unlicensed |
| NW | Network |
| PCell | Primary Cell |
| PSCell | Primary Secondary Cell |
| PDCCH | Physical Downlink Control Channel |
| PDSCH | Physical Downlink Shared Channel |
| PDU | Protocol Data Unit |
| PHY | Physical |
| PRACH | Physical Random Access Channel |
| PUCCH | Physical Uplink Control Channel |
| PUSCH | Physical Uplink Shared Channel |
| RA | Random Access |
| RAN | Radio Access Network |
| RAR | Random Access Response |
| Rel | Release |
| RF | Radio Frequency |
| RLF | Radio Link Failure |
| RRC | Radio Resource Control |
| SCell | Secondary Cell |
| SCG | Secondary Cell Group |
| SpCell | Special Cell |
| SR | Scheduling Request |
| SRS | Sounding Reference Signal |
| TAG | Timing Advance Group |
| TB | Transport Block |
| TDD | Time Division Duplex |
| TR | Technical Report |
| TS | Technical Specification |
| TX | Transmission |
| UE | User Equipment |
| UL | Uplink |
| WG | Working Group |
| WI | Work Item |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference designators. Moreover, the drawings and illustrations in the present disclosure are generally not to scale and are not intended to correspond to actual relative dimensions.

For consistency and ease of understanding, like features are identified (although, in some examples, not illustrated) by reference designators in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation" do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), via a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, in a transmission time interval of a single NR frame, at least DL transmission data, a guard period, and UL transmission data should be included, where the respective portions of the DL transmission data, the guard period, and the UL transmission data should also be configurable, for example, based on the network dynamics of NR. Furthermore, an SL resource may also be provided in an NR frame to support ProSe services.

NR-based Access to Unlicensed Spectrum is one of the WIs in Rel-16. This WI specifies NR enhancements for a single global solution framework for access to unlicensed spectrum which enables operation of NR in the 5 GHz and the 6 GHz unlicensed bands taking into account regional regulatory requirements (e.g., specified in 3GPP TR 38.889 V16.0.0). The NR-U design enables fair coexistence between the deployed Wi-Fi generations and NR-U, between the NR-U and LTE-LAA, between different NR-U systems, etc.

NR defines Type 1 and Type 2 configured grant mechanisms (e.g., specified in 3GPP TS 38.321 V15.7.0). These two types of configured grant mechanisms are included in NR-U as well. For the retransmission of a HARQ process that was initially transmitted via a configured UL grant resource, retransmission via the same configured UL grant resource and retransmission via resource scheduled by UL grant are supported.

In an unlicensed spectrum, a UE may perform channel access before performing a transmission in order to make sure there are no other devices occupying the channel where the transmission is intended to be performed. For the channel access mechanism in NR-U, the LTE-LAA LBT mechanism may be adopted as a baseline for the 5 GHz band and adopted as the starting point of the design for the 6 GHz band. At least for the band where the absence of Wi-Fi cannot be guaranteed (e.g., by regulation), LBT may be performed in the unit of 20 MHz. In general, there may be 4 LBT categories. The introduction of each LBT category may be provided as follows. For NR-U, a UE may perform LBT using one of the 4 LBT categories before performing an UL transmission for different transmissions in a COT and different channels/signals to be transmitted. For example, a UE may perform LBT using different LBT categories before performing RACH, PUCCH, PUSCH and/or SRS transmissions.

Category 1: Immediate Transmission after a Short Switching Gap

This may be used for a transmitter to immediately transmit after a switching gap inside a COT. In one implementation, the switching gap from reception to transmission is to accommodate the transceiver turn-around time and is no longer than 16 μs.

Category 2: LBT without Random Back-Off

The duration of time that the channel (where transmission is intended to be performed) is sensed to be idle before the transmitting entity transmits is deterministic.

Category 3: LBT with Random Back-Off with a Contention Window of Fixed Size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel (where transmission is intended to be performed) is sensed to be idle before the transmitting entity transmits on the channel.

Category 4: LBT with Random Back-Off with a Contention Window of Variable Size

The LBT procedure has the following as one of its components. The transmitting entity draws a random number N within a contention window. The size of the contention window is specified by the minimum and maximum value of N. The transmitting entity can vary the size of the contention window when drawing the random number N. The random number N is used in the LBT procedure to determine the duration of time that the channel (where transmission is intended to be performed) is sensed to be idle before the transmitting entity transmits on the channel.

NR Radio Access operating in Unlicensed Spectrum (referred to as NR-U) can be used in a SpCell, a PCell, an SCell, and/or a PSCell. In one example, in the stand-alone mode, all cells may be operated in the unlicensed spectrum. In another example, when NR-U SCells are in the unlicensed spectrum, the PCell may be in the licensed spectrum. An NR-U SCell may or may not be configured with UL resources for transmission. The DC-type of operation may be configured with an E-UTRAN node (connected to the EPC or the 5GC) as the MN, or configured with an NR node as described in 3GPP TS 37.340.

The gNB and UE may apply LBT before performing a transmission on (NR-U) cells. When LBT is applied, the transmitter listens to/senses the channel to determine whether the channel is free or busy and performs transmission only if the channel is sensed free.

When a UE detects consistent LBT failure on an UL BWP (of a serving cell), the UE may take actions as specified in TS 38.321 to deal with the consistent LBT failure. The detection of consistent LBT failure may be based on all UL transmissions in the UL BWP. When consistent LBT failure is detected on the SCell(s), the UE may report the occurrence of the consistent LBT failure to the corresponding gNB (e.g., MN for MCG, SN for SCG). When consistent LBT failure is detected on a SpCell (e.g., PCell and/or PSCell), the UE may switch to another UL BWP having configured RACH resources on that cell and initiate an RA procedure (on that cell). When multiple UL BWPs are available for BWP switching, the selection of the target UL BWP may depend on UE implementation. In addition, if consistent LBT failure is detected on a PSCell, the UE may switch the active BWP, declare the occurrence of SCG RLF (e.g., determine that SCG RLF happens), and inform the MN of the consistent LBT failure. If the UL LBT failure is detected on a PCell, the UE may perform BWP switching and declare the occurrence of RLF (e.g., determine that RLF happens).

UL transmissions may be performed by a UE only if the UE performs LBT successfully. The maximum continuous transmission time (upon successful LBT) may be predetermined by a MCOT value. For example, LBT may be considered successful if the channel is sensed to be idle (e.g., the power detected by a UE on the channel, which is to be used for an UL transmission, is less than a predetermined/configured power threshold) for a predetermined/configured period of time during an LBT procedure (if LBT category 2/3/4 is performed). Otherwise, LBT is considered failed, and the UE's MAC entity may receive an LBT failure indication from its PHY layer.

In the present disclosure, (UL) LBT may refer to an LBT procedure performed by a UE before an UL transmission; (UL) LBT failure may delay the UL transmission because the UE has to (re)transmit the data on the subsequent UL resource(s). Some of the procedures with UL transmissions may be initiated by a UE, e.g., CBRA, SR, transmission on a configured UL grant resource, etc. In this situation, the NW may not know whether the UE fails to perform the UL transmissions due to (UL) LBT failure or not. Moreover, the NW may not be able to predict the UL channel condition from the UE's perspective due to the hidden node (e.g., the NW may not be aware of another device in the vicinity of the UE that is also performing UL transmission). Therefore, the NW may not be able to prevent the UE from suffering (UL) LBT failure in a timely manner, e.g., via a configuration or an indication. The present disclosure provides an LBT failure detection and recovery procedure to handle consistent LBT failure by the UE in an NR-U system. The LBT failure recovery procedure may be initiated by the UE upon the detection of one or more (consistent) (UL) LBT failure event(s) in order to prevent the unwanted delay of UL transmission(s).

A counter referred to LBT_COUNTER, a timer referred to lbt-FailureDetectionTimer, and a threshold referred to lbt-FailureInstanceMaxCount may be used in the (UL) LBT failure mechanism (e.g., LBT failure detection and recovery procedure). The LBT_COUNTER, lbt-FailureDetectionTimer, and lbt-FailureInstanceMaxCount may be configured/maintained per BWP/cell/CG/subset of CG basis. The LBT_COUNTER may be initially set to zero upon (re-)configuration and may be incremented by the UE when an (UL) LBT failure happens or when an LBT failure indication is received from PHY. (UL) LBT failure may be caused by any (or specific) UL transmission type. In other words, the LBT_COUNTER may be incremented when any (or specific) type of UL transmissions cannot be performed due to the detection of (UL) LBT failure. For example, the value of LBT_COUNTER may be increased by one every time if a (UL) LBT failure is detected by a UE.

The UE may be configured with the lbt-FailureDetectionTimer by the NW. The lbt-FailureDetectionTimer may be (re)started when any (or specific) type of UL transmission cannot be performed due to (UL) LBT failure. In another example, the lbt-FailureDetectionTimer may be (re)started by the UE whenever the LBT_COUNTER is incremented. The LBT_COUNTER may be set to zero when the lbt-FailureDetectionTimer expires.

If the value of LBT_COUNTER is equal to (or larger than) the lbt-FailureInstanceMaxCount, the UE may consider that consistent LBT failure is detected (on the corresponding UL BWP). In response to the detection of consistent LBT failure, the UE may initiate an LBT recovery procedure (e.g., trigger consistent LBT failure for the active UL BWP in this Serving Cell). The LBT recovery procedure may be different depending on which UL BWP and/or cell the consistent LBT failure is detected.

In one implementation, if consistent LBT failure is detected on a UL BWP of a PCell (e.g., the value of LBT_COUNTER reaches the lbt-FailureInstanceMaxCount for the corresponding UL BWP), an LBT failure detection and recovery procedure on the PCell may include the detection of the consistent LBT failure for the corresponding UL BWP and the initiation of an RA procedure on another BWP configured with RACH resources (e.g., the UE switches the active (UL) BWP to another BWP configured with a PRACH occasion). Moreover, an LBT failure MAC CE (indicating the serving cell and/or BWP for which LBT failure is detected) may be transmitted to the NW. However, if consistent LBT failure has been detected on all the BWPs (configured with a PRACH occasion), where the BWPs on the PCell are configured with RACH resources (e.g., PRACH occasions), an RLF (procedure) may be triggered according to conditions specified in 3GPP TS 38.331 V15.7.0, as illustrated in FIG. 1.

FIG. 1 illustrates a flowchart for an LBT failure detection and recovery procedure 100 for a PCell, in accordance with an implementation of the present disclosure.

In action 102, a UE may detect consistent LBT failure on $BWP_i$ on a PCell (e.g., the value of LBT_COUNTER reaches the lbt-FailureInstanceMaxCount for the corresponding $BWP_i$).

In action 104, the UE may determine whether consistent LBT failure has been detected on all (UL) BWPs configured with PRACH resource(s) on the PCell.

In action 106, if the outcome of action 104 is No, the UE may switch the active BWP to a new BWP that is configured with PRACH resource(s) and initiate an RA procedure on the new BWP. The UE may also report an LBT failure MAC CE (e.g., indicating the serving cell and/or BWP for which LBT failure is detected) to the NW. After action 106, the UE may continue to determine whether consistent LBT failure is detected on the new BWP.

In action 108, if the outcome of action 104 is Yes, the UE may trigger an RLF procedure.

In one implementation, if consistent LBT failure is detected on an UL BWP of a PSCell (e.g., the value of LBT_COUNTER reaches the lbt-FailureInstanceMaxCount for the corresponding UL BWP), an LBT failure detection and recovery procedure on the PSCell may include the detection of the consistent LBT failure for the corresponding UL BWP and the initiation of an RA procedure on another BWP configured with RACH resources (e.g., the UE switches the active (UL) BWP to another BWP configured with a PRACH occasion). Moreover, an LBT failure MAC CE (indicating the serving cell and/or BWP for which LBT failure is detected) may be transmitted to the NW. However, if consistent LBT failure has been detected on all of the BWPs (configured with a PRACH occasion) on the PSCell where the BWPs on the PSCell are configured with RACH resources (e.g., PRACH occasion), the UE may report the SCG failure information to the NW according to certain conditions specified in 3GPP TS 38.331 V15.7.0, as illustrated in FIG. 2.

Figure 2:
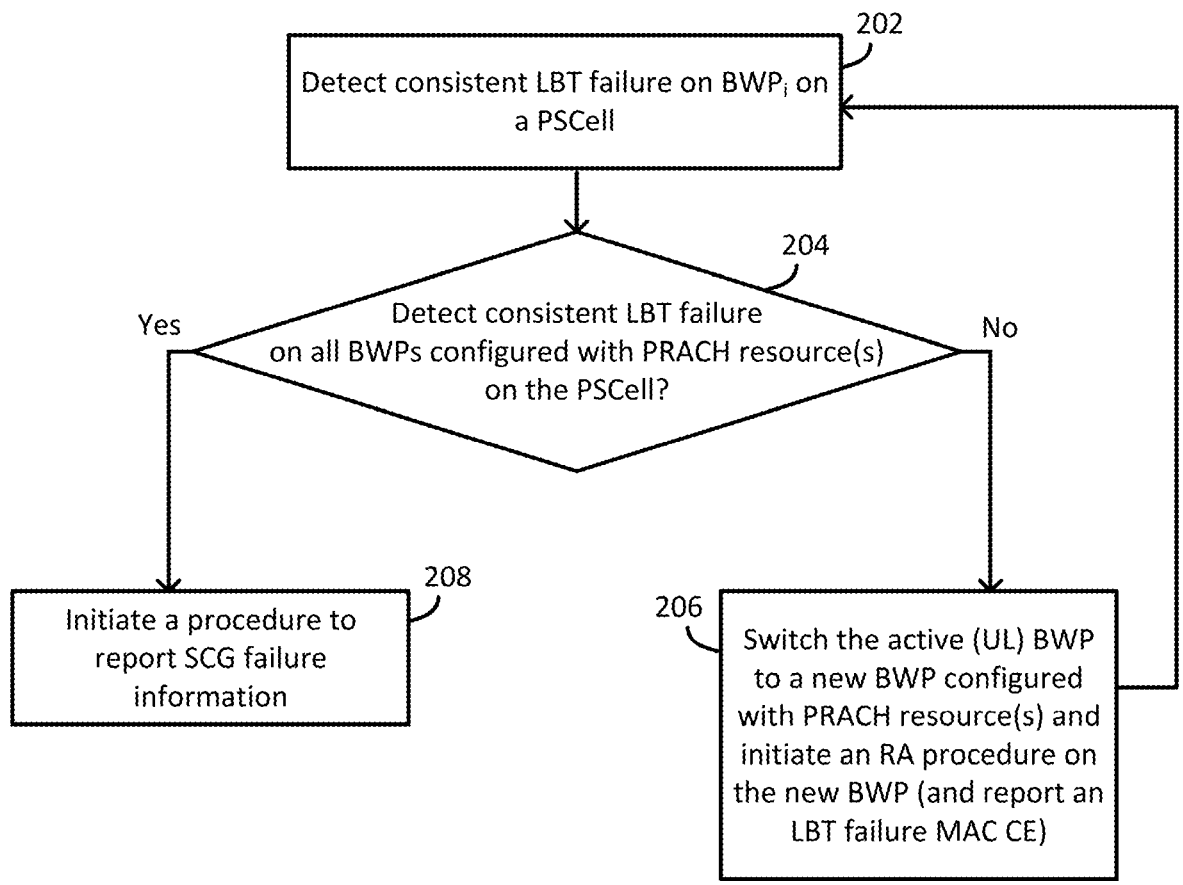
FIG. 2 illustrates a flowchart for an LBT failure detection and recovery procedure for a Primary Secondary Cell (PSCell), in accordance with an implementation of the present disclosure.

FIG. 2 illustrates a flowchart for an LBT failure detection and recovery procedure 200 for a PSCell, in accordance with an implementation of the present disclosure.

In action 202, a UE may detect consistent LBT failure on $BWP_i$ on a PSCell, e.g., when the value of LBT_COUNTER reaches the lbt-FailureInstanceMaxCount for the corresponding $BWP_i$.

In action 204, the UE may determine whether consistent LBT failure has been detected on all BWPs configured with PRACH resource(s) on the PSCell.

In action 206, if the outcome of action 204 is No, the UE may switch the active (UL) BWP to a new BWP that is configured with PRACH resource(s) and initiate an RA procedure on the new BWP. The UE may also report an LBT failure MAC CE (e.g., indicating the serving cell and/or BWP for which LBT failure is detected) to the NW.

In action 208, if the outcome of action 204 is Yes, the UE may initiate a procedure to report SCG failure information to the NW.

Figure 3:
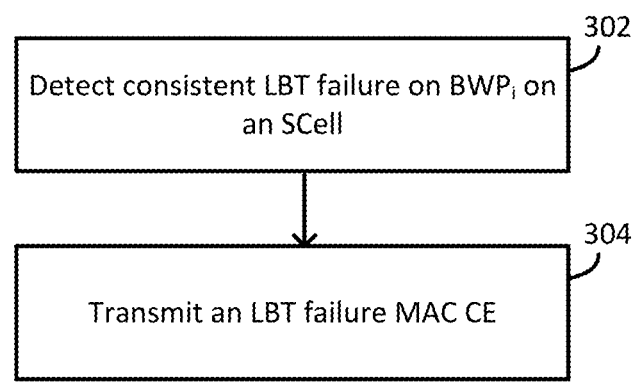
FIG. 3 illustrates a flowchart for an LBT failure detection and recovery procedure for a Secondary Cell (SCell), in accordance with an implementation of the present disclosure.

In one implementation, if consistent LBT failure is detected on a BWP on an SCell (e.g., LBT_COUNTER reaches lbt-FailureInstanceMaxCount for the corresponding UL BWP), an LBT failure detection and recovery procedure on the SCell may include the detection of consistent LBT failure for the corresponding BWP and the transmission of an LBT failure MAC CE (indicating the failed Cell and/or BWP) to the NW, as illustrated in FIG. 3.

FIG. 3 illustrates a flowchart for an LBT failure detection and recovery procedure 300 for an SCell, in accordance with an implementation of the present disclosure.

In action 302, a UE may detect consistent LBT failure on $BWP_i$ on an SCell, e.g., when the value of LBT_COUNTER reaches the lbt-FailureInstanceMaxCount for the $BWP_i$.

In action 304, the UE may transmit an LBT failure MAC CE (e.g., indicating the serving cell and/or BWP on which LBT failure is detected) to the NW.

Triggering of Consistent LBT Failure Procedure and/or LBT-SR Procedure

A UE (or the UE's MAC entity) may perform an LBT failure detection and recovery procedure. The UE may detect consistent LBT failure per UL BWP by counting LBT failure indications, for all UL transmissions, from the UE's lower layer (e.g., PHY layer) to the UE's MAC entity. An example of the LBT failure detection and recovery procedure is illustrated in Table 1.

In order to let the NW know on which UL BWP of the serving cell the consistent LBT failure occurs, the UE may transmit an LBT failure MAC CE to the NW. For example, the UE may trigger a procedure of consistent LBT failure (generation and transmission) (e.g., instruct the Multiplexing and Assembly procedure to generate the LBT failure MAC CE) if consistent LBT failure is detected for an active UL BWP (e.g., if LBT_COUNTER>=lbt-FailureInstanceMaxCount). During the procedure, if the UE determines that at least one consistent LBT failure (MAC CE procedure) has been triggered and not canceled, the UE may further determine if any UL-SCH resource is available.

TABLE 1

For each activated Serving Cell configured with lbt-FailureRecoveryConfig, the MAC entity
shall:
    1> if LBT failure indication has been received from lower layers:
        2> start or restart the lbt-FailureDetectionTimer;
        2> increment LBT_COUNTER by 1;
        2> if LBT_COUNTER >= lbt-FailureInstanceMaxCount:
            3> trigger consistent LBT failure for the active UL BWP in this Serving Cell;
            3> if this Serving Cell is an SCell:
                4> instruct the Multiplexing and assembly entity to include an LBT failure MAC
                    CE in the subsequent UL transmission.
            3> else (i.e. SpCell):
                4> if consistent LBT failure has been detected in all UL BWPs configured with
                    PRACH occasions in this Serving Cell:
                    5> indicate consistent LBT failure to upper layers.
                4> else:
                    5> switch the active UL BWP to an UL BWP, in this Serving Cell, configured
                        with PRACH occasion and for which consistent LBT failure has not been
                        detected;
                    5> perform the BWP operation;
                    5> initiate a Random Access Procedure.
    1> if the lbt-FailureDetectionTimer expires; or
    1> if lbt-FailureDetectionTimer or lbt-FailureInstanceMaxCount is reconfigured by upper
        layers:
        2> set LBT_COUNTER to 0.

If an UL-SCH resource(s) is available for a new transmission and the available UL-SCH resource(s) can accommodate the LBT failure MAC CE plus its subheader as a result of logical channel prioritization, the UE may instruct the Multiplexing and Assembly procedure to generate the LBT failure MAC CE. However, in some situations, there may be no available UL resources. If no UL resource is available, the UE may need to trigger an SR procedure (for consistent LBT failure or for LBT failure MAC CE), which may refer to an LBT-SR (procedure) or an SR procedure specified in 3GPP TS 38.321 V15.7.0.

For the convenience of the present disclosure, the procedure of LBT failure (MAC CE generation and transmission) may refer to a consistent LBT failure procedure.

Figure 4:
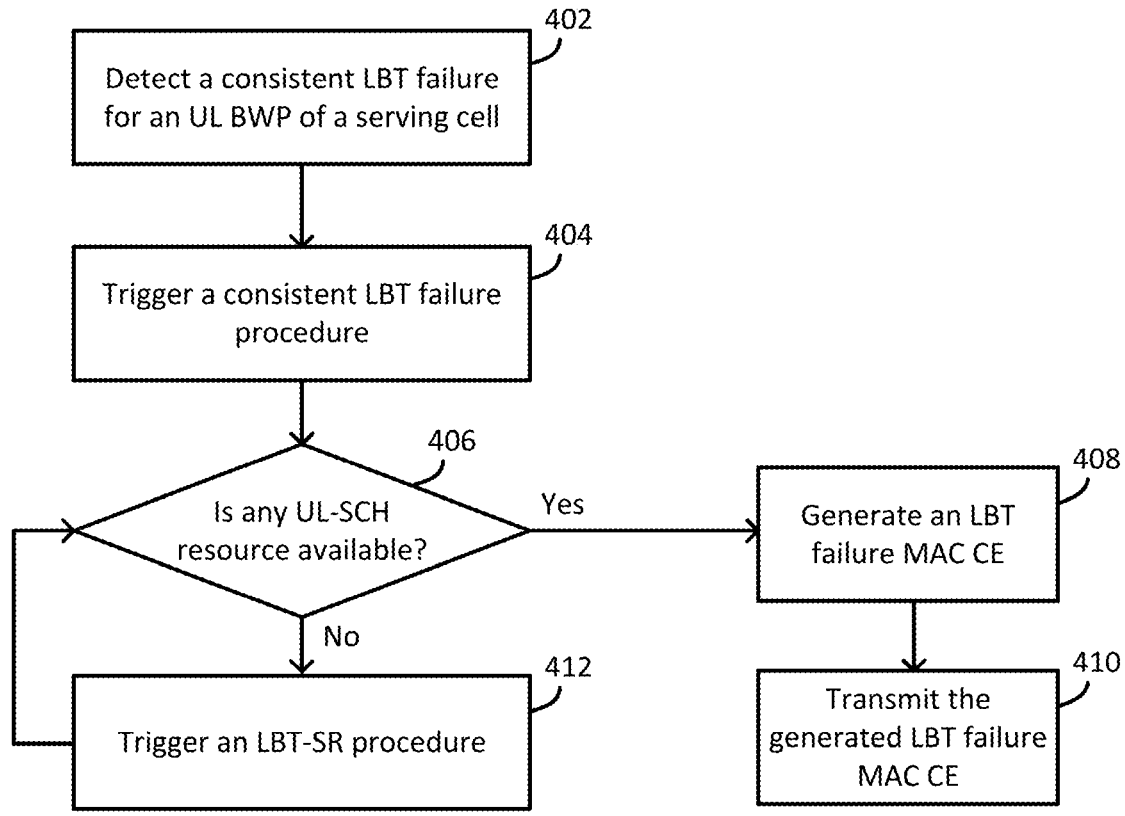
FIG. 4 illustrates a flowchart for an LBT failure detection and recovery procedure, in accordance with an implementation of the present disclosure.

FIG. 4 illustrates a flowchart for an LBT failure detection and recovery procedure 400, in accordance with an implementation of the present disclosure.

Multiplexing and Assembly procedure, which is maintained by the UE's MAC entity, to generate the LBT failure MAC CE.

In action 410, the UE may transmit the generated LBT failure MAC CE to the NW via the available UL-SCH resource.

In action 412, if there is no available UL-SCH resource for transmission, the UE may trigger an LBT-SR procedure.

In one implementation, the LBT-SR procedure e may be triggered after the assembly of a MAC PDU (containing the LBT failure MAC CE) and before the transmission of this MAC PDU. In one implementation, the LBT-SR procedure may be triggered during the MAC PDU assembly.

Cancellation of Consistent LBT Failure Procedure and/or LBT-SR Procedure

In one implementation, if at least one consistent LBT failure procedure has been triggered and not canceled, the UE may perform the behaviors in Table 2.

TABLE 2

The MAC entity may:
    1> if a consistent LBT failure has been triggered and not canceled:
        2> if UL-SCH resources are available for a new transmission and the UL-SCH resources
            can accommodate the LBT failure MAC CE plus its subheader as a result of logical
            channel prioritization:
            3> instruct the Multiplexing and Assembly procedure to generate the LBT failure
                MAC CE.
        2> else:
            3> trigger a Scheduling Request for LBT failure MAC CE In action 402, a UE may detect a consistent LBT failure for an UL BWP of a serving cell.

In action 404, the UE may trigger a consistent LBT failure procedure.

In action 406, the UE may determine whether there is any UL-SCH resource available (e.g., if there are UL-SCH resources available for a new transmission in the SpCell and these UL-SCH resources can accommodate the LBT failure MAC CE plus its subheader as a result of logical channel prioritization).

In action 408, if there is at least one available UL-SCH resource for transmission, the UE may generate an LBT failure MAC CE. For example, the UE may perform a In one implementation, when an SR procedure for LBT failure MAC CE or for the consistent LBT failure (e.g., LBT-SR procedure) is triggered, the SR procedure may be considered pending until it is canceled. As long as there is at least one pending SR procedure (e.g., LBT-SR procedure) at the UE, the UE may perform the behaviors in Table 3.

Considering that the UE may perform certain behaviors disclosed in Table 3 when there is a triggered consistent LBT failure procedure and/or a pending LBT-SR procedure, there may be a need to determine one or more conditions to cancel the triggered consistent LBT failure procedure and/or the LBT-SR procedure, in order to prevent the UE from performing unnecessary behaviors/actions.

For example, during an LBT failure detection and recovery procedure, the triggered consistent LBT failure procedure and/or the pending LBT-SR procedure corresponding to the LBT failure detection and recovery procedure may be canceled if certain conditions are satisfied. Details of the conditions are provided subsequently.

In one implementation, a triggered consistent LBT failure procedure and/or the pending LBT-SR procedure may be canceled if one or more of the following conditions (1) to (10) is satisfied:

(1) UL-SCH Resources are Available for LBT Failure MAC CE Transmission

If UL-SCH resources are available for a new transmission and the UL-SCH resources can accommodate the LBT MAC CE plus its subheader (e.g., the LBT MAC CE's subheader) as a result of logical channel prioritization, the UE may instruct the Multiplexing and Assembly procedure to generate the LBT failure MAC CE. Otherwise, the UE may trigger an SR procedure for LBT failure MAC CE or for the consistent LBT failure (e.g., LBT-SR procedure).

In one implementation, if the UL-SCH resources are available for a new transmission and the UL-SCH resources can accommodate the LBT MAC CE plus its subheader as a result of logical channel prioritization, the UE may cancel (all) the triggered consistent LBT failure procedure(s) and/or the pending LBT-SR procedure(s). In one implementation, if the UE instructs the Multiplexing and Assembly procedure to generate the LBT failure MAC CE, the UE may cancel (all) the triggered consistent LBT failure procedure(s) and/or the pending LBT-SR procedure(s)

procedure and/or the pending LBT-SR procedure when the LBT failure MAC CE includes all the information of BWP(s)/serving cell(s) which triggered the consistent LBT failures prior to the MAC PDU assembly.

For example, if the LBT failure MAC CE only indicates/includes one BWP ID and/or one serving cell ID, the UE may only cancel the triggered consistent LBT failure procedure and/or the pending LBT-SR procedure when the MAC PDU includes all triggered consistent LBT failure procedures prior to the MAC PDU assembly.

For example, if the LBT failure MAC CE only indicates/includes one (or multiple) BWP ID(s) and/or one (or multiple) serving cell ID(s), the UE may only cancel the consistent LBT failure procedure(s) triggered for the corresponding BWP(s) and/or serving cell(s).

In one implementation, the MAC PDU assembly may occur at any point in the time interval between the UL grant reception and the actual transmission of the corresponding MAC PDU via the UL resource from the UL grant.

In one implementation, the consistent LBT failure(s) and/or the pending LBT-SR procedure(s) may be triggered prior to the MAC PDU assembly.

(2) LBT Failure MAC CE is Transmitted

If the UE instructs the Multiplexing and Assembly procedure to generate the LBT failure MAC CE, the UE may perform the Multiplexing and assembly procedure (including Logical Channel prioritization procedure) as specified in 3GPP TS 38.321 V15.7.0. During the multiplexing and

TABLE 3

As long as at least one SR is pending, the MAC entity may perform the following operation(s) for each pending SR (procedure):
   1> if the MAC entity has no valid PUCCH resource configured for the pending SR:
      2> initiate a Random Access procedure (see clause 5.1) on the SpCell and cancel the
         pending SR.
   1> else, for the SR configuration corresponding to the pending SR:
      2> when the MAC entity has an SR transmission occasion on the valid PUCCH resource
         for SR configured; and
      2> if sr-ProhibitTimer is not running at the time of the SR transmission occasion; and
      2> if the PUCCH resource for the SR transmission occasion does not overlap with a
         measurement gap; and
      2> if the PUCCH resource for the SR transmission occasion does not overlap with a UL-
         SCH resource:
         3> if SR_COUNTER < sr-TransMax:
            4> increment SR_COUNTER by 1;
            4> instruct the physical layer to signal the SR on one valid PUCCH resource for
               SR;
            4> start the sr-ProhibitTimer.
         3> else:
            4> notify RRC to release PUCCH for all Serving Cells;
            4> notify RRC to release SRS for all Serving Cells;
            4> clear any configured downlink assignments and UL grants;
            4> clear any PUSCH resources for semi-persistent CSI reporting;
            4> initiate a Random Access procedure (see clause 5.1) on the SpCell and cancel
               all pending SRs.

If the UE instructs the Multiplexing and Assembly procedure to generate the LBT failure MAC CE, the UE may perform the Multiplexing and assembly procedure (including Logical Channel prioritization procedure) (e.g., as specified in 3GPP TS 38.321 V15.7.0). During the Multiplexing and Assembly procedure, the UE may multiplex the generated MAC CE(s) and/or MAC SDU(s) in a MAC PDU.

In one implementation, the UE may only cancel the triggered consistent LBT failure procedure and/or the pending LBT-SR procedure if the MAC PDU includes all of the (information of) triggered consistent LBT failure procedure.

For example, if the LBT failure MAC CE indicates/includes multiple BWP IDs and/or multiple serving cell IDs, the UE may only cancel the triggered consistent LBT failure assembly procedure, the UE may multiplex the generated MAC CE(s) and/or MAC SDU(s) in a MAC PDU. Then the UE may transmit the MAC PDU (e.g., via a UL-SCH resource) to the NW.

In one implementation, when a MAC PDU is transmitted and the MAC PDU includes the LBT failure MAC CE(s), the UE may cancel (all) the triggered consistent LBT failure procedure(s) and/or the pending LBT-SR procedure(s).

In one implementation, when a MAC PDU is transmitted and this MAC PDU includes an LBT failure MAC CE that indicates the information of a first BWP and/or a first serving cell, the UE may cancel the triggered consistent LBT failure procedure which was triggered by the first BWP and/or the first serving cell. For example, if the triggered consistent LBT failure procedure is triggered by a first BWP and/or a first serving cell, the UE may cancel the triggered consistent LBT failure procedure if the LBT failure MAC CE includes the first BWP ID and/or the first serving cell ID. In one implementation, the UE may not cancel a triggered consistent LBT failure procedure if the LBT failure MAC CE does not include the first BWP ID and/or the first serving cell ID.

In one implementation, when a MAC PDU is transmitted and this MAC PDU includes an LBT failure MAC CE, the UE may cancel all the triggered consistent LBT failure procedure(s) and/or the pending LBT-SR procedure(s) (prior to the MAC PDU assembly) only if the LBT failure MAC CE includes the information of all the BWP(s) and/or serving cell(s) that triggered the consistent LBT failure procedure prior to the MAC PDU assembly. In contrast, the UE may not cancel any triggered consistent LBT failure procedure(s) and/or pending LBT-SR procedure(s) (prior to the MAC PDU assembly) if the LBT failure MAC CE does not include the information of all the BWP(s) and/or serving cell(s) that triggered the consistent LBT failure procedure prior to the MAC PDU assembly.

In one implementation, MAC PDU assembly may occur at any point in the time interval between the UL grant reception and the actual transmission of the corresponding MAC PDU.

In one implementation, the triggered consistent LBT failure procedure and/or the pending LBT-SR procedure may be triggered prior to the MAC PDU assembly.

(3) A Positive Response is Received/Determined by the UE for LBT Failure MAC CE Transmission In one implementation, the LBT failure MAC CE may be transmitted on a first UL-SCH resource (if the UL-SCH resources are available for a new transmission and the first UL-SCH resources can accommodate the LBT failure MAC CE plus its subheader as a result of logical channel prioritization) via the first HARQ process. After the transmission of the first UL-SCH resource via the first HARQ process, the UE may receive/determine a positive response for the first HARQ process.

In one implementation, the positive response may be a PDCCH (addressed to a C-RNTI) indicating an UL grant for a new transmission for this HARQ process (e.g., used for LBT failure MAC CE transmission) from the NW. In one implementation, the positive response may be explicit DL HARQ feedback information from the NW to indicate that the first HARQ process has been successfully received. In one implementation, the positive response may be received from a PDCCH (addressed to a C-RNTI) containing an UL grant for a new transmission from the NW during the period of time that the ra-ContentionResolutionTimer (e.g., specified in 3GPP TS 38.321 V15.7.0) is running if the first UL-SCH resource was scheduled by the RAR of an RA procedure. In one implementation, the positive response may be determined by the UE upon expiry of a configuredGrantTimer (e.g., specified in 3GPP TS 38.321 V15.7.0) if the first UL-SCH resource corresponds to a configured UL grant configuration.

In one implementation, a first LBT failure MAC CE may be transmitted on a first UL-SCH resource via a first HARQ process. If the UE receives a PDCCH (addressed to a C-RNTI) indicating an UL grant for a new transmission for the first HARQ process, the UE may cancel (all) the triggered consistent LBT failure procedure and/or the pending LBT-SR procedure.

In one implementation, a first LBT failure MAC CE may be transmitted on a first UL-SCH resource via a first HARQ process. If the UE receives a PDCCH (addressed to a C-RNTI) indicating an UL grant for a new transmission for the first HARQ process, the UE may cancel the triggered consistent LBT failure procedure if the first LBT failure MAC CE includes information of the triggered consistent LBT failure procedure. For example, if a consistent LBT failure procedure is triggered by a first BWP and/or a first serving cell, the UE may cancel the triggered consistent LBT failure procedure if the first LBT failure MAC CE includes the first BWP ID (indicating the first BWP) and/or the first serving cell ID (indicating the first serving cell). In one implementation, the UE may not cancel a triggered consistent LBT failure procedure if the first LBT failure MAC CE does not include the first BWP ID and/or the first serving cell ID.

In one implementation, a first LBT failure MAC CE may be transmitted on a first UL-SCH resource via a first HARQ process. If the UE receives (explicit) DL HARQ feedback information indicating that the first LBT failure MAC CE transmitted via the first HARQ process has been successfully received, the UE may cancel (all) the triggered consistent LBT failure procedure and/or the pending LBT-SR procedure.

In one implementation, a first LBT failure MAC CE may be transmitted on a first UL-SCH resource via a first HARQ process. If the UE receives (explicit) DL HARQ feedback information indicating that a first LBT failure MAC CE transmitted via the first HARQ process has been successfully received, the UE may cancel the triggered consistent LBT failure procedure if the first LBT failure MAC CE includes information of the triggered consistent LBT failure procedure. For example, if the triggered consistent LBT failure procedure is triggered for a first BWP and/or a first serving cell, the UE may cancel the triggered consistent LBT failure procedure if the first LBT failure MAC CE includes the first BWP ID (indicating the first BWP) and/or the first serving cell ID (indicating the first serving cell). In one implementation, the UE may not cancel a triggered consistent LBT failure procedure if the first LBT failure MAC CE does not include the first BWP ID and/or the first serving cell ID.

In one implementation, a first LBT failure MAC CE may be transmitted on a first UL-SCH resource, which was scheduled by an RAR of an RA procedure. If the UE receives a PDCCH (addressed to C-RNTI) containing UL grant for a new transmission from the NW during the period of time that the ra-ContentionResolutionTimer (e.g., specified in 3GPP TS 38.321 V15.7.0) is running, the UE may cancel (all) the triggered consistent LBT failure procedure and/or the pending LBT-SR procedure.

In one implementation, a first LBT failure MAC CE may be transmitted on a first UL-SCH resource, which was scheduled by an RAR of an RA procedure. If the UE receives a PDCCH (addressed to C-RNTI) containing a UL grant for a new transmission from the NW during the period of time that ra-ContentionResolutionTimer (e.g., specified in 3GPP TS 38.321 V15.7.0) is running, the UE may cancel the triggered consistent LBT failure procedure if the first LBT failure MAC CE includes information of the triggered consistent LBT failure procedure. For example, if the triggered consistent LBT failure procedure is triggered by a first BWP and/or a first serving cell, the UE may cancel the triggered consistent LBT failure procedure if the first LBT failure MAC CE includes the first BWP ID (indicating the first BWP) and/or the first serving cell ID (indicating the first serving cell). In one implementation, the UE may not cancel a triggered consistent LBT failure procedure if the first LBT failure MAC CE does not include the first BWP ID and/or the first serving cell ID.

In one implementation, a first LBT failure MAC CE may be transmitted on a first UL-SCH resource, via a first HARQ process corresponding to a configured UL grant configuration. When the configuredGrantTimer (e.g., specified in 3GPP TS 38.321 V15.7.0) that corresponds to the first HARQ process expires, the UE may cancel (all) the triggered consistent LBT failure procedure and/or the pending LBT-SR procedure.

In one implementation, a first LBT failure MAC CE may be transmitted on a first UL-SCH resource, via a first HARQ process corresponding to a configured UL grant configuration. If the configuredGrantTimer (e.g., specified in 3GPP TS 38.321 V15.7.0) that corresponds to the first HARQ process expires, the UE may cancel the triggered consistent LBT failure procedure if the first LBT failure MAC CE includes information of the triggered consistent LBT failure procedure. For example, if the triggered consistent LBT failure procedure is triggered by a first BWP and/or a first serving cell, the UE may cancel the triggered consistent LBT failure procedure if the first LBT failure MAC CE includes the first BWP ID (indicating the first BWP ID) and/or the first serving cell ID (indicating the first serving cell). In one implementation, the UE may not cancel a triggered consistent LBT failure procedure if the first LBT failure MAC CE does not include the first BWP ID and/or the first serving cell ID.

(4) The BWP/Serving Cell where the UE Triggers the Consistent LBT Failure is Deactivated/Released If a UE detects consistent LBT failure on a BWP of a serving cell, the UE may trigger a consistent LBT failure procedure and/or an LBT-SR procedure for the BWP and/or the serving cell. If the BWP and/or the serving cell (which results in the triggering of the consistent LBT failure procedure) is deactivated/released by the UE, the UE may cancel the triggered consistent LBT failure procedure (for the BWP and/or the serving cell) and/or cancel the pending LBT-SR procedure (for the BWP and/or the serving cell).

In one implementation, if a UE detects consistent LBT failure on a first BWP of a first serving cell, the UE may trigger a first consistent LBT failure procedure for the first BWP of the first serving cell. If the first BWP and/or the first serving cell is deactivated/released, the UE may cancel the triggered first consistent LBT failure procedure (for the first BWP of the first serving cell) and/or an LBT-SR procedure (for the first BWP of the first serving cell).

In one implementation, a BWP may be deactivated when a BWP inactivity timer associated with the BWP expires.

In one implementation, a BWP may be deactivated when the UE switches from the BWP to another BWP (of the same serving cell). The BWP switch may be triggered when the UE receives an indication for BWP switching from the NW or when a BWP inactivity timer associated with the BWP expires.

In one implementation, a serving cell may be deactivated when the UE receives an SCell Activation/Deactivation MAC CE (e.g., specified in 3GPP TS 38.321 V15.7.0) for deactivating the SCell.

In one implementation, a serving cell may be deactivated when an SCell deactivation timer (e.g., specified in 3GPP TS 38.321 V15.7.0) associated with the activated SCell expires.

In one implementation, a serving cell/BWP may be released when the UE receives specific RRC signaling from the NW.

The BWP switching for a Serving Cell is used to activate one inactive BWP and deactivate one active BWP at a time. The BWP switching may be controlled by the PDCCH indicating a downlink assignment or an uplink grant, by the bwp-InactivityTimer, by RRC signaling, or by the MAC entity itself upon initiation of Random Access procedure or upon detection of consistent LBT failure on SpCell.

(5) A Parameter/Configuration for the LBT (e.g., Lbt-FailureRecoveryConfig, Lbt-FailureDetection Timer and/or Lbt-FailureInstanceMaxCount) is Reconfigured The parameter(s)/configuration for an LBT failure recovery (e.g., lbt-FailureRecoveryConfig) may include an LBT failure detection timer (lbt-FailureDetectionTimer), an LBT failure instance counter (lbt-FailureInstanceMaxCount), and/or other parameters which are configured in an NR-U configuration (e.g., NRU-UplinkLbtFailureConfig).

In one implementation, if the lbt-FailureRecoveryConfig, lbt-FailureDetectionTimer and/or lbt-FailureInstanceMaxCount is reconfigured by the NW, the UE may cancel (all) the triggered consistent LBT failure procedure(s) and/or the pending LBT-SR procedure(s).

In one implementation, if the lbt-FailureRecoveryConfig, lbt-FailureDetectionTimer and/or lbt-FailureInstanceMaxCount associated with a BWP and/or a serving cell is reconfigured, the UE may cancel the triggered consistent LBT failure procedure(s) and/or the pending LBT-SR procedure(s) triggered for the BWP and/or the serving cell.

In one implementation, if the lbt-FailureRecoveryConfig, lbt-FailureDetectionTimer and/or lbt-FailureInstanceMaxCount associated with a BWP and/or a serving cell is reconfigured by the NW, the UE may cancel the consistent LBT failure procedure(s) and/or the pending LBT-SR procedure(s) triggered for the BWP and/or the serving cell.

In one implementation, the parameter(s) and/or configuration(s) for the LBT (e.g., lbt-FailureRecoveryConfig, lbt-FailureDetectionTimer and/or lbt-FailureInstanceMaxCount) may be reconfigured by the higher layer (e.g., the RRC layer) and/or an NW node.

(6) Lbt-FailureDetectionTimer Expires and/or LBT_COUNTER is Reset

In one implementation, if the lbt-FailureDetectionTimer expires and/or the LBT_COUNTER is reset, the UE may cancel the triggered consistent LBT failure procedure(s) and/or the pending LBT-SR procedure(s).

In one implementation, if the lbt-FailureDetectionTimer associated with a BWP and/or a serving cell expires, the UE may cancel the triggered consistent LBT failure procedure(s) and/or the pending LBT-SR procedure(s) triggered for the BWP and/or the serving cell.

In one implementation, if the LBT_COUNTER associated with a BWP and/or a serving is reset, the UE may cancel the triggered consistent LBT failure procedure(s) and/or the pending LBT-SR procedure(s) triggered for the BWP and/or the serving cell.

(7) LBT Failure Recovery Procedure is Considered Successful/Completed

In one implementation, when consistent LBT failure is detected (e.g., on a BWP and/or a serving cell), the UE may initiate an LBT failure recovery procedure (for the BWP and/or the serving cell). The LBT failure recovery procedure may be considered successful/completed when one or multiple or any combinations of the previously disclosed criteria for canceling triggered consistent LBT failure procedure and/or pending LBT-SR procedure are satisfied.

In one implementation, if the UE considers that an LBT failure recovery procedure is successful, the UE may cancel (all) the triggered LBT MAC CE(s) and/or pending LBT-SR procedure(s).

In one implementation, if the UE considers that an LBT failure recovery procedure initiated on a BWP and/or a serving cell is successful, the UE may cancel the triggered LBT MAC CE(s) for the BWP and/or the serving cell, and/or the UE may cancel the pending LBT-SR procedure(s) for the BWP and/or the serving cell.

(8) RA Procedure is Initiated Due to the Absence of a Valid PUCCH Resource Configured for the Triggered/Pending LBT-SR Procedure When an LBT-SR procedure is triggered, a UE may transmit an LBT-SR on a PUCCH resource configured for the pending LBT-SR procedure (e.g., the PUCCH resource that maps to an SR configuration (e.g., specified in 3GPP TS 38.331 V15.7.0) corresponding to the pending LBT-SR procedure. A MAC entity may be configured with one or more SR configuration. However, if the MAC entity does not have a valid PUCCH resource configured for the pending LBT-SR procedure (e.g., no PUCCH resource maps to the SR configuration corresponding to the LBT-SR), the UE may initiate an RA procedure and cancel the pending LBT-SR procedure.

(9) RA Procedure is Initiated if the SR_COUNTER Reaches Sr-TransMax for the SR Configuration that Corresponds to the Pending SR When an LBT-SR procedure is triggered, a UE may transmit an LBT-SR on a PUCCH resource configured for the pending LBT-SR procedure. For each LBT-SR transmission, the value of the SR_COUNTER (obtained from an SR configuration that corresponds to the pending LBT-SR procedure) may be incremented by 1. However, if the SR_COUNTER of the SR configuration (corresponding to the pending LBT-SR procedure) reaches a sr-TransMax value configured for the SR configuration (corresponding to the pending LBT-SR procedure), the UE may initiate an RA procedure and cancel all the pending LBT-SR procedure(s).

(10) LBT Failure Recovery Procedure is Considered Unsuccessful/Failed

When consistent LBT failure is detected (e.g., on a BWP and/or a serving cell), the UE may initiate an LBT failure recovery procedure (for the BWP and/or the serving cell). In one implementation, the LBT failure recovery procedure may be considered unsuccessful/failed if a specific timer expires and/or the number of LBT-SR transmissions (and/or LBT failure MAC CE transmissions) reaches a threshold.

In one implementation, if the UE considers that an LBT failure recovery procedure is unsuccessful, the UE may cancel (all) the triggered consistent LBT failure procedure(s) and/or pending LBT-SR procedure(s).

In one implementation, if the UE considers that an LBT failure recovery procedure initiated on a BWP and/or a serving cell is unsuccessful, the UE may cancel the consistent triggered LBT failure procedure(s) for the BPW and/or the serving cell, and/or the UE may cancel the pending LBT-SR procedure(s) for the BWP and/or the serving cell.

In one implementation, an LBT failure detection and recovery procedure may be canceled (or stopped) if the UE considers that the LBT failure detection and recovery procedure is successful/completed or unsuccessful/failed.

Overlap of Triggered/Pending SR Procedures

When an SR procedure, a BFR-SR procedure, and/or an LBT-SR procedure is triggered, it may be considered as pending until it is canceled. When the SR procedure, BFR-SR procedure, or LBT-SR procedure (e.g., SR procedure for LBT failure MAC CE) is pending, the UE may select the valid PUCCH resource to signal/transmit one of the triggered/pending SR procedures. In other words, the priority of different types of triggered/pending SRs may be different. The UE may signal/transmit an SR with the highest priority via a valid PUCCH resource if the PUCCH resources for the triggered SRs are overlapping with each other.

In one implementation, if the UL resource for LBT-SR transmission collides with another PUCCH resource (e.g., for specific UCI/SR/BFR-SR/HARQ feedback/SRS/CSI report, etc.) in the time domain, the UE may prioritize the PUCCH resource for LBT-SR transmission over another PUCCH resource.

In one implementation, the priority of BFR-SR transmission may be higher than that of LBT-SR transmission. In one implementation, the priority of BFR-SR transmission may be the same as that of LBT-SR transmission.

In one implementation, when there are multiple pending SR procedures at the UE and the UE has more than one overlapping valid PUCCH resource for the SR transmission occasion, wherein the multiple pending SR procedures include a pending BFR-SR procedure (e.g., triggered due to BFR event) and a pending LBT-SR procedure (e.g., triggered due to consistent LBT failure event), the UE may select the valid PUCCH resource for BFR to signal the BFR-SR (e.g., not select for LBT).

In one implementation, when there are multiple pending SR procedures at the UE and the UE has more than one overlapping valid PUCCH resource for the SR transmission occasion, wherein the multiple pending SR procedures include a pending BFR-SR procedure (i.e., triggered due to BFR event) and a pending LBT-SR procedure (i.e., triggered due to consistent LBT failure event), the UE may select one of the valid PUCCH resource(s) for BFR (or LBT) to signal/transmit the corresponding SR.

In one implementation, the priority of transmitting an LBT-SR/BFR-SR/SR may be configured in the SR configuration (e.g., an IE may be included in the SchedulingRequestToAddMod IE (e.g., specified in 3GPP TS 38.331 V15.7.0) to indicate "high priority" or "low priority") that corresponds to the LBT-SR/BFR-SR/SR. The UE may signal a specific SR with the highest configured priority via a valid PUCCH resource if the PUCCH resource for the triggered SR procedure s overlapping with each other.

In one implementation, the LBT-SR may apply the same or different SR configurations for BFR-SR. For example, the LBT-SR may apply the same ID of the SR configuration (e.g., schedulingRequestId), sr-ProhibitTimer, and/or sr-TransMax as BFR-SR. For example, the rules or priority for BFR-SR may also be applied to the LBT-SR. In one implementation, the UE may indicate the information via the PUCCH resource for SR transmission to inform the NW of the purpose of transmitting this SR (e.g., for LBT or for BFR). For example, an LBT-SR and a BFR-SR may apply the same or different SR configurations. In one implementation, the information may be indicated by different PUCCH resource occasions preconfigured by the NW. In one implementation, the information may be indicated via an ID of the SR, which may be preconfigured by the NW.

In one implementation, the LBT-SR and/or the LBT failure MAC CE may be signaled/transmitted on a BWP and/or a serving cell which is different from a BWP and/or a serving cell which is detected consistent LBT failure. For example, if consistent LBT failure is detected on a first BWP of a first serving cell, the UE may signal the LBT-SR on a second BWP and/or a second serving cell (e.g., via a PUCCH resource configured for the second BWP and/or the second serving cell). In other words, if a UE detects consistent LBT failure on a BWP and/or a serving cell, the UE may not signal LBT-SR (via a PUCCH resource) on the BWP and/or the serving cell which is detected consistent LBT failure. In one implementation, the UE may switch an UL BWP to another UL BWP to signal the LBT-SR. Alternatively, the UE may signal the LBT-SR only on a SpCell.

In one implementation, the UE may not transmit another PUCCH during a transmission occasion which overlaps the LBT-SR transmission occasion.

In one implementation, the UE may only transmit the LBT-SR during a transmission which overlaps the another PUCCH resource.

In one implementation, the UE may drop the transmission on another PUCCH resource during a transmission which overlaps the LBT-SR transmission occasion.

In one implementation, if the UL resource (e.g., a PUCCH resource) for the LBT-SR transmission occasion overlaps another PUCCH resource, the UE may suspend another PUCCH transmission during the LBT-SR transmission occasion. The UE may resume another PUCCH transmission after performing the LBT-SR transmission. The UE may drop another PUCCH transmission if the suspend result in an unacceptable time delay (e.g., require a long time to wait for the next PUCCH resource).

In one implementation, if the UL resource (e.g., PUCCH resource) for the LBT-SR transmission occasion overlaps another PUCCH resource, the UE may skip the other PUCCH transmission during the LBT-SR transmission occasion.

In one implementation, if the UL resource for LBT-SR transmission overlaps another PUCCH resource, the UE may multiplex the BFR-SR with another PUCCH resource. For example, the UE may transmit the LBT-SR via the other PUCCH resource (e.g., for specific UCI, SR, HARQ feedback, SRS, and/or CSI report, etc.).

In one implementation, if the UL resource (e.g., PUCCH resource) for the LBT-SR transmission occasion overlaps an ongoing transmission on a PUCCH resource, the UE may terminate the ongoing transmission on a PUCCH resource.

In one implementation, whether the priority of LBT-SR transmission is higher (or lower) than another PUCCH resource (e.g., for specific UCI, SR, HARQ feedback, SRS, and/or CSI report, etc.) may be determined based on a configuration. For example, the UE may be configured with a priority for an LBT-SR transmission, and be configured with a priority for an SR transmission.

In one implementation, whether the priority of LBT-SR transmission is higher (or lower) than another PUCCH resource (e.g., for specific UCI, SR, HARQ feedback, SRS, and/or CSI report, etc.) may be specified in the 3GPP technical specification.

In one implementation, whether the priority of LBT-SR transmission is higher (or lower) than SR may be determined based on the characteristics or configuration of the LBT-SR and/or SR transmission. For example, the priority may be determined based on the periodicity of the resource for LBT-SR transmission and the resource for SR transmission. For example, when the periodicity is shorter, the priority may be higher. In one implementation, the priority may be based on an index of the LBT-SR and SR configuration. For example, a configuration associated with a lower index value may be directed to the higher priority for the LBT-SR transmission.

In one implementation, if the UL resource (e.g., a PUCCH resource) for the LBT-SR transmission occasion overlaps SR transmission, the prioritization rule may be used to determine whether to transmit a BFR-SR or an SR based on the priority of the LCH that triggers the SR. For example, if the SR transmission is triggered by an LCH with high priority (e.g., the priority parameter configured for the LCH is lower than a threshold or has a specific priority value), the UE may prioritize the SR transmission over the LBT-SR transmission. In another example, if the SR transmission is triggered by an LCH with low priority (e.g., the priority parameter configured for the LCH is higher than a threshold or is a specific priority) the UE may prioritize the LBT-SR transmission over the SR transmission. In another example, if the SR transmission is on a PUCCH resource that belongs to a cell where beam failure is detected (e.g., the cell that triggers the LBT-SR procedure), and the UL resource for SR transmission overlaps the UL resource for LBT-SR transmission, the UE may prioritize the BFR-SR transmission over the SR transmission.

In one implementation, the priority may be configured by the NW in a logical channel configuration (e.g., which corresponds to an IE denoted as LogicalChannelConfig and specified in 3GPP TS 38.331 V15.7.0).

In one implementation, each SR configuration may correspond to one or more LCHs, and each LCH may map to zero or one SR configuration.

In one implementation, the SR configuration of the LCH that triggers the regular BSR (if such a configuration exists) may be considered as the SR configuration for the triggered SR procedure. On the other hand, for a regular BSR procedure triggered due to the expiry of the retxBSR-Timer, the UE may consider that the LCH (which has data available for transmission) that triggers the regular BSR procedure has the highest priority for transmission when the regular BSR procedure is triggered. The SR configuration for the triggered SR procedure may be associated with the highest priority LCH. Moreover, if the LCH is not mapped to any SR configuration, and the LCH triggers a BFR procedure, the UE may initiate an RA procedure to request an UL resource.

In one implementation, if the LBT-SR is prioritized over the SR (e.g., determined in MAC entity of the UE), the MAC entity of the UE may not instruct the PHY layer of the UE to signal/transmit an SR on a valid PUCCH resource for SR transmission. The MAC entity of the UE may instruct the PHY layer of the UE to signal/transmit an LBT-SR on a valid PUCCH resource for LBT-SR transmission.

Figure 5:
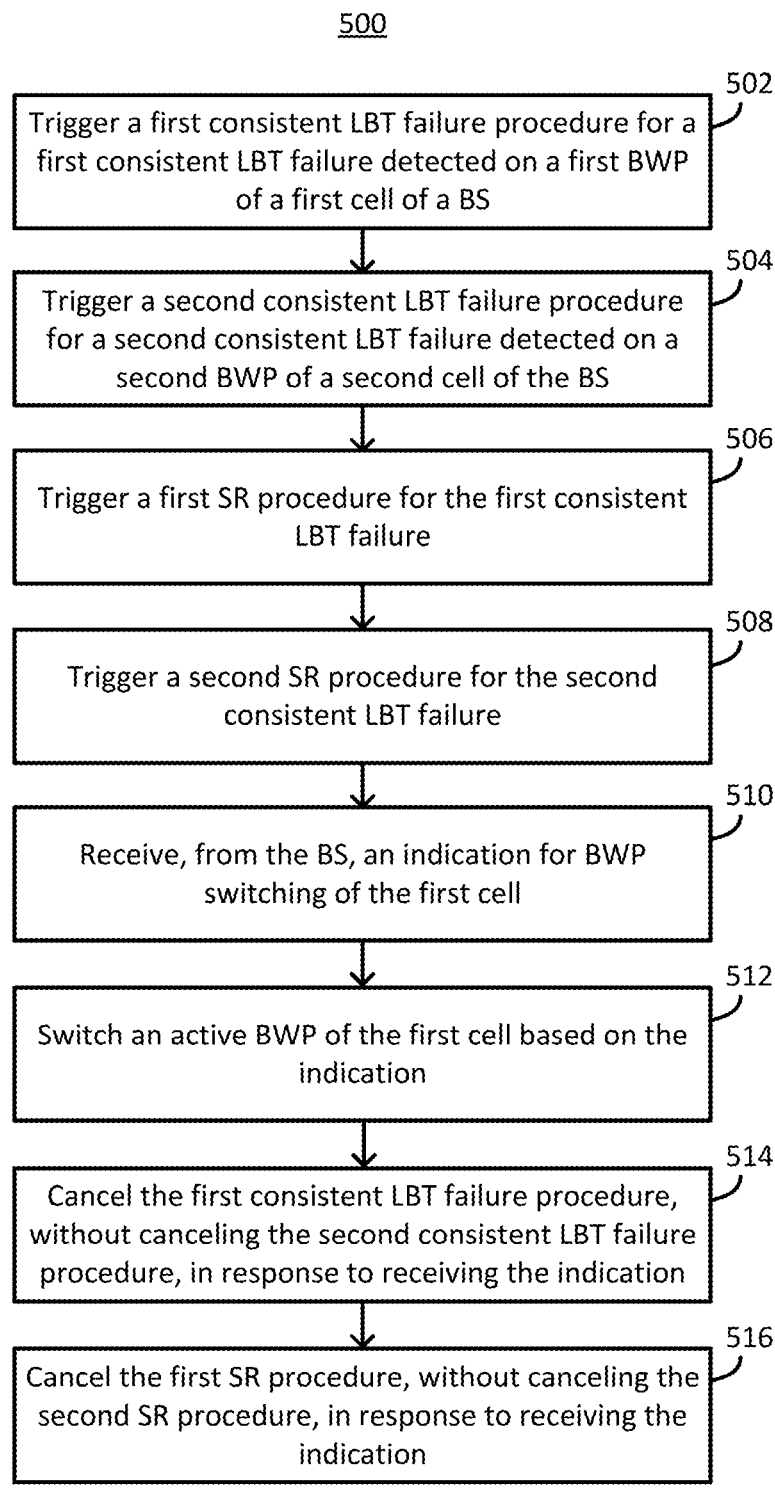
FIG. 5 illustrates a flowchart for a method of LBT failure detection and recovery, in accordance with an implementation of the present disclosure.

FIG. 5 illustrates a flowchart for a method 500 of LBT failure detection and recovery, in accordance with an implementation of the present disclosure. It should be noted that although actions 502, 504, 506, 508, 510, 512, 514 and 516 are illustrated as separate actions represented as independent blocks in FIG. 5, these separately delineated actions should not be construed as necessarily order dependent. The order in which the actions are performed in FIG. 5 is not intended to be construed as a limitation, and any number of the disclosed blocks may be combined in any order to implement the method, or an alternate method. Moreover, one or more of the actions 502, 504, 506, 508, 510, 512, 514, and 516 may be omitted in some of the present implementations.

In action 502, a UE may trigger a first consistent LBT failure procedure for a first consistent LBT failure detected on a first BWP of a first cell of a BS. For example, the UE may be configured with LBT-related parameters (via an RRC configuration lbt-FailureRecoveryConfig), such as LBT_COUNTER and lbt-FailureInstanceMaxCount, for the first BWP. If the value of the LBT_COUNTER configured for the first BWP is equal to (or larger than) the lbt- FailureInstanceMaxCount for the first BWP, the UE may consider that the first consistent LBT failure is detected on the first BWP.

In action 504, the UE may trigger a second consistent LBT failure procedure for a second consistent LBT failure detected on a second BWP of a second cell of the BS. For example, the UE may be configured with LBT-related parameters (via an RRC configuration lbt-FailureRecoveryConfig), such as LBT_COUNTER and lbt-FailureInstanceMaxCount, for the second BWP. If the value of the LBT_COUNTER configured for the second BWP is equal to (or larger than) the lbt-FailureInstanceMaxCount for the second BWP, the UE may consider that the second consistent LBT failure is detected on the second BWP.

In on implementation, the first BWP and the second BWP may be UL BWPs.

In on implementation, the first cell and the second cell may be SCells.

In action 506, the UE may trigger a first SR procedure for the first consistent LBT failure.

In action 508, the UE may trigger a second SR procedure for the second consistent LBT failure.

In one implementation, the first SR procedure and/or the second SR procedure may be triggered when at least one of a plurality of conditions is fulfilled. The plurality of conditions may include:

(1) no UL-SCH resource is available for a new transmission, and (2) as a result of logical channel prioritization, an UL-SCH resource allocated to the UE cannot accommodate an LBT failure MAC CE and a sub-header of the LBT failure MAC CE.

In action 510, the UE may receive, from the BS, an indication for BWP switching of the first cell.

In one implementation, the BWP switching for a Serving Cell is used to activate an inactive BWP and deactivate an active BWP at a time.

In one implementation, a BWP may be switched/deactivated when a BWP inactivity timer associated with the BWP expires.

In one implementation, a BWP may be deactivated when the UE switches from the BWP to another BWP (of the same serving cell). The BWP switching may be triggered, e.g., when the UE receives an indication for BWP switching from the NW or when a BWP inactivity timer associated with the BWP expires.

In one implementation, the indication (for BWP switching) may be received on a PDCCH or via RRC signaling.

In some implementations, the BWP switching may be controlled by the PDCCH indicating a DL assignment or an UL grant, by the bwp-InactivityTimer, by RRC signaling, or by the MAC entity itself upon initiation of RA procedure or upon detection of consistent LBT failure on SpCell.

In action 512, the UE may switch an active BWP of the first cell based on the indication.

In one implementation, the active BWP may be a DL BWP. In one implementation, the active BWP maybe an UL BWP. In one implementation, the active BWP may include a DL BWP and an UL BWP.

In one implementation, the UE may switch the active BWP to an indicated BWP in response to receiving the indication. For example, the UE may switch the active BWP (e.g., if the active BWP is an UL BWP) from the first BWP to a specific BWP based on the indication, wherein the BWP ID of the specific BWP may be indicated by the indication.

In action 514, the UE may cancel the first consistent LBT failure procedure, without canceling the second consistent LBT failure procedure, in response to receiving the indication. For example, the UE may not cancel the second consistent LBT failure procedure in response to receiving the indication. The UE may keep the second consistent LBT failure procedure ongoing in response to receiving the indication.

In action 516, the UE may cancel the first SR procedure, without canceling the second SR procedure, in response to receiving the indication. For example, the UE may not cancel the second SR procedure in response to receiving the indication. The UE may keep the second SR procedure ongoing in response to receiving the indication.

In one implementation, the cancelation of a consistent LBT failure procedure may refer to canceling the consistent LBT failure procedure that has been triggered by the UE. For example, when a consistent LBT failure procedure is canceled, the UE may not consider the consistent LBT failure procedure is triggered. Otherwise, the UE may consider the consistent LBT failure procedure has been triggered and not canceled. If the consistent LBT failure is considered triggered and not canceled, the UE may determine whether to instruct the Multiplexing and Assembly procedure to generate the LBT failure MAC CE. If the consistent LBT failure procedure is canceled, the UE may not instruct the Multiplexing and Assembly procedure to generate the LBT failure MAC CE related to this consistent LBT failure procedure.

In one implementation, the cancelation of an SR procedure for a consistent LBT failure may refer to canceling the pending SR procedure for the consistent LBT failure. For example, when the SR procedure for the consistent LBT failure is canceled, the UE may not consider the SR procedure for the consistent LBT failure is pending. Otherwise, the UE may consider the SR procedure for the consistent LBT failure is pending. More specifically, when an SR procedure is triggered, it shall be considered as pending until it is canceled.

In one implementation, the SR procedure for the consistent LBT failure may refer to an SR procedure for an LBT failure MAC CE.

Figure 6:
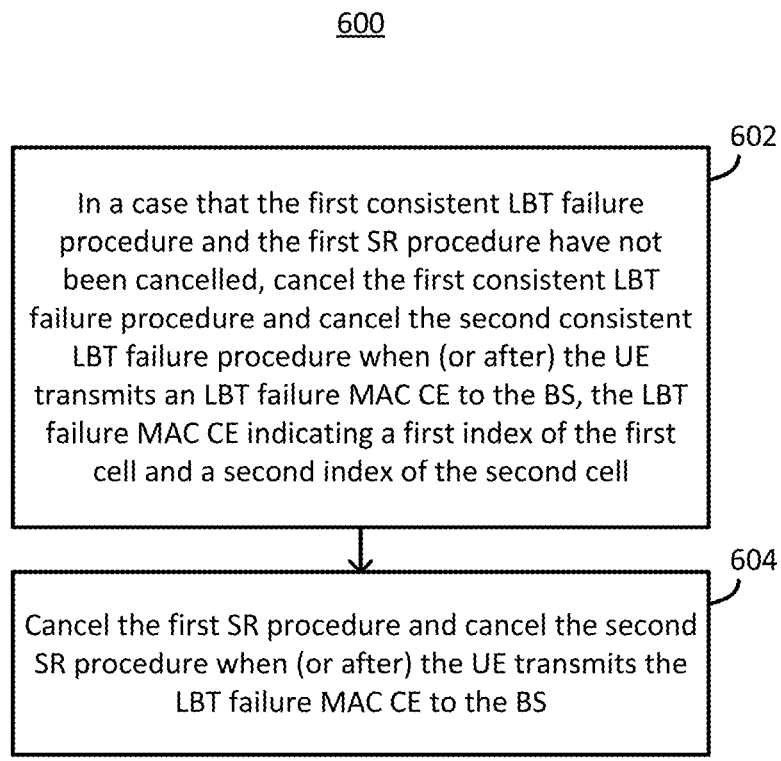
FIG. 6 illustrates a flowchart for a method of LBT failure detection and recovery, in accordance with an implementation of the present disclosure.

FIG. 6 illustrates a flowchart for a method 600 of LBT failure detection and recovery, in accordance with an implementation of the present disclosure. The method 600 may be performed after the UE triggers the first and second consistent LBT failure procedures and the first and second SR procedures based on the method 500 in FIG. 5.

In action 602, in a case that the first consistent LBT failure procedure and the first SR procedure have not been canceled (e.g., the UE has not received the indication for BWP switching yet), the UE may cancel the first consistent LBT failure procedure and may cancel the second consistent LBT failure procedure when (or after) the UE transmits an LBT failure MAC CE to the BS. The LBT failure MAC CE may indicate a first index of the first cell and a second index of the second cell.

In action 604, the UE may cancel the first SR procedure and may cancel the second SR procedure when (or after) the UE transmits the LBT failure MAC CE to the BS.

Figure 7:
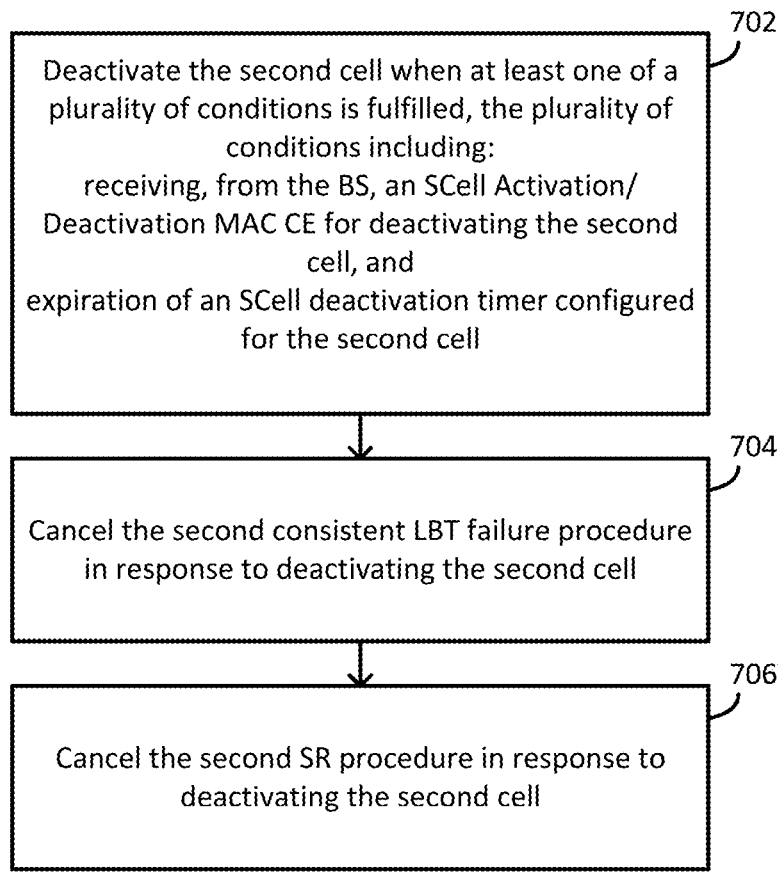
FIG. 7 illustrates a flowchart for a method of LBT failure detection and recovery, in accordance with an implementation of the present disclosure.

FIG. 7 illustrates a flowchart for a method 700 of LBT failure detection and recovery, in accordance with an implementation of the present disclosure. The method 700 may be (or may not be) performed based on the method 500 in FIG. 5.

In action 702, the UE may deactivate the second cell (e.g., the second cell indicated in action 504 of FIG. 5) when at least one of a plurality of conditions is fulfilled. The plurality of conditions includes:

receiving, from the BS, an SCell Activation/Deactivation MAC CE for deactivating the second cell, and expiration of an SCell deactivation timer configured for the second cell.

In action 704, the UE may cancel the second consistent LBT failure procedure (e.g., the second consistent LBT failure procedure triggered in action 504 of FIG. 5) in response to deactivating the second cell. For example, the UE may only cancel the second consistent LBT failure procedure and not cancel the first consistent LBT failure procedure in response to deactivating the second cell.

In action 706, the UE may cancel the second SR procedure (e.g., the second SR procedure triggered in action 508 of FIG. 5) in response to deactivating the second cell. For example, the UE may only cancel the second SR procedure and not cancel the first SR procedure in response to deactivating the second cell.

Figure 8:
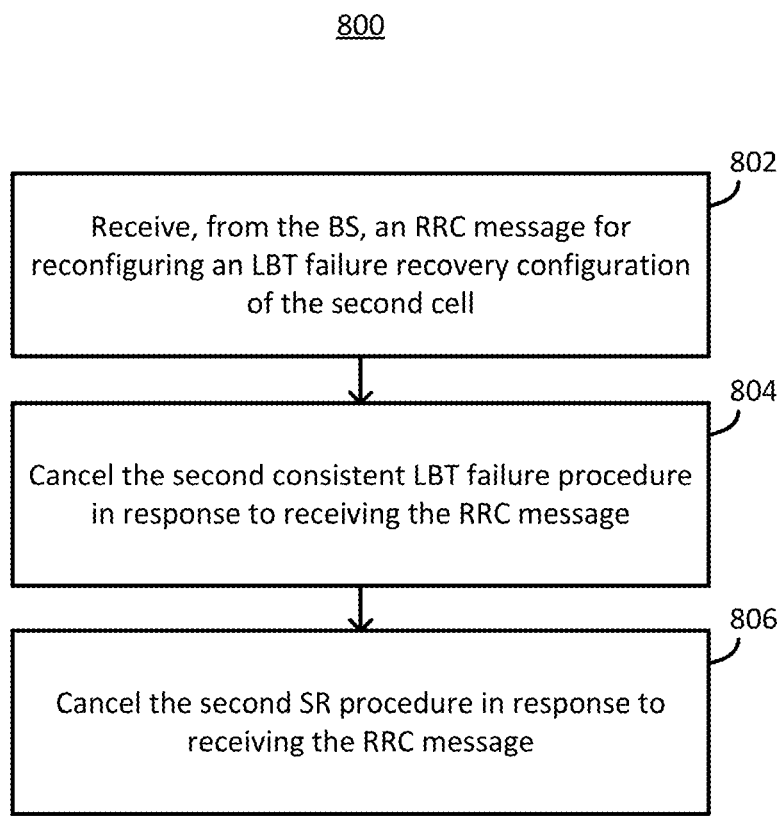
FIG. 8 illustrates a flowchart for a method of LBT failure detection and recovery, in accordance with an implementation of the present disclosure.

FIG. 8 illustrates a flowchart for a method 800 of LBT failure detection and recovery, in accordance with an implementation of the present disclosure. The method 800 may be (or may not be) performed based on the method 500 in FIG. 5.

In action 802, the UE may receive, from the BS, an RRC message for reconfiguring an LBT failure recovery configuration of the second cell.

In action 804, the UE may cancel the second consistent LBT failure procedure (e.g., the second consistent LBT failure procedure triggered in action 504 of FIG. 5) in response to receiving the RRC message. For example, the UE may only cancel the second consistent LBT failure procedure and not cancel the first consistent LBT failure procedure in response to receiving the RRC message.

In action 806, the UE may cancel the second SR procedure (e.g., the second SR procedure triggered in action 508 of FIG. 5) in response to receiving the RRC message. For example, the UE may only cancel the second SR procedure and not cancel the first SR procedure in response to receiving the RRC message.

Figure 9:
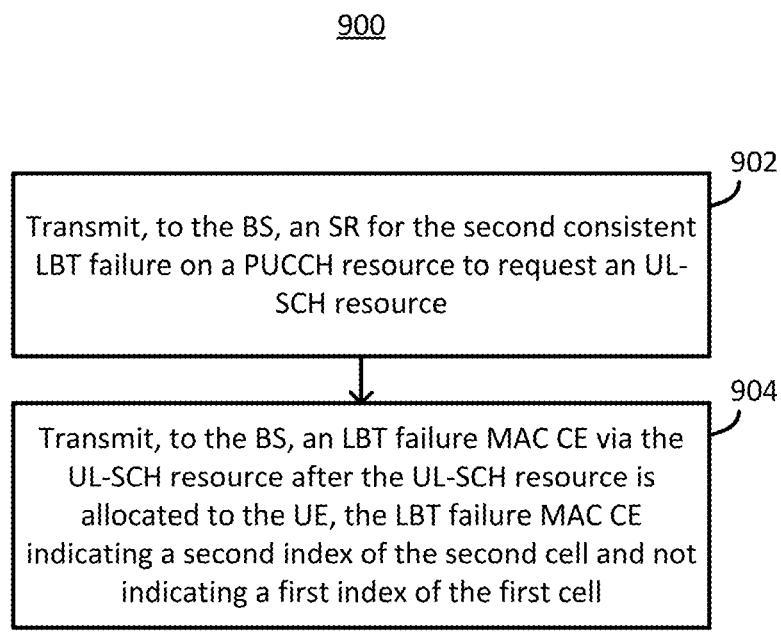
FIG. 9 illustrates a flowchart for a method of LBT failure detection and recovery, in accordance with an implementation of the present disclosure.

FIG. 9 illustrates a flowchart for a method 900 of LBT failure detection and recovery, in accordance with an implementation of the present disclosure. The method 900 may be (or may not be) performed based on the method 500 in FIG. 5. For example, the method 900 may be performed in a case that the first consistent LBT failure procedure and the first SR procedure have been canceled (e.g., after actions 514 and 516 of FIG. 5).

In action 902, the UE may transmit, to the BS, an SR for the second consistent LBT failure (e.g., the second consistent LBT failure detected in action 504 of FIG. 5) on a PUCCH resource to request an UL-SCH resource.

In action 904, the UE may transmit, to the BS, an LBT failure MAC CE via the UL-SCH resource after the UL-SCH resource is allocated to the UE, the LBT failure MAC CE indicating a second index of the second cell and not indicating a first index of the first cell.

Figure 10:
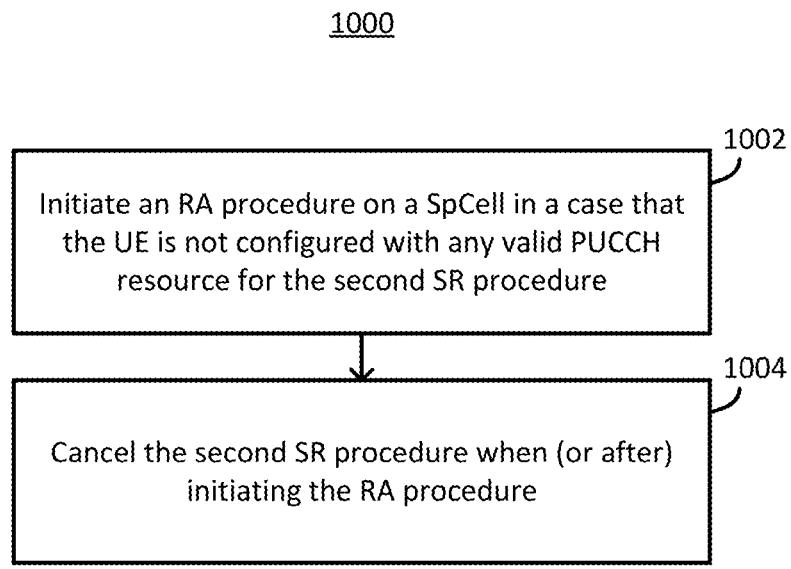
FIG. 10 illustrates a flowchart for a method of LBT failure detection and recovery, in accordance with an implementation of the present disclosure.

FIG. 10 illustrates a flowchart for a method 1000 of LBT failure detection and recovery, in accordance with an implementation of the present disclosure. The method 1000 may be (or may not be) performed based on the method 500 in FIG. 5.

In action 1002, the UE may initiate an RA procedure on a SpCell in a case that the UE is not configured with any valid PUCCH resource for the second SR procedure (e.g., the second SR procedure triggered in action 508 of FIG. 5).

In action 1004, the UE may cancel the second SR procedure when (or after) initiating the RA procedure.

The following disclosure may be used to further elaborate the terms, examples, implementations, actions, behaviors, alternatives, or aspects of the present disclosure.

UE: The UE may refer to PHY/MAC/RLC/PDCP/SDAP entity. The PHY/MAC/RLC/PDCP/SDAP entity may refer to the UE.

NW: The NW may be a NW node, a TRP, a cell (e.g., SpCell, PCell, PSCell, and/or SCell), an eNB, a gNB, and/or a base station.

Serving Cell: A PCell, a PSCell, or an SCell. The serving cell may be an activated or a deactivated serving cell.

SpCell: For Dual Connectivity operation the term Special Cell refers to the PCell of the MCG or the PSCell of the SCG depending on if the MAC entity is associated with the MCG or the SCG, respectively. Otherwise, the term Special Cell refers to the PCell. A Special Cell supports PUCCH transmission and contention-based RA, and is always activated.

CC/Cell: The CC/Cell may be PCell, PSCell, and/or SCell.

UL-SCH resource: The UL-SCH resource may be RACH resource, PUCCH resource, and/or PUSCH resource. The UL-SCH resource may be scheduled by a dynamic grant (e.g., via PDCCH) and/or configured by RRC (e.g., type 1/type 2 configured UL grant or preconfigured in RRC configuration).

SR: an SR may be used for requesting an UL-SCH resource (e.g., PUSCH resource) for a new transmission. A UE may trigger an SR procedure to transmit the SR. In the present disclosure, the term "triggered SR" may refer to a triggered SR procedure; the term "pending SR" may refer to a pending SR procedure. A UE may be configured with zero, one, or more SR configurations. An SR configuration may consist of a set of PUCCH resources for SR across different BWPs and cells. For a logical channel, at most one PUCCH resource for SR is configured per BWP. Each SR configuration may correspond to one or more logical channels. Each logical channel may be mapped to zero or one SR configuration. The SR configuration of the logical channel that triggered the BSR (if such a configuration exists) is considered as a corresponding SR configuration for the triggered SR (procedure). When an SR (procedure) is triggered, it shall be considered as pending until it is canceled.

LBT-SR: An LBT-SR may be transmitted via a dedicated SR-like PUCCH resource for LBT (recovery). The LBT-SR may be used to inform NW of an LBT failure event and/or used for requesting UL-SCH resource(s) for LBT failure MAC CE transmission. The UE may be configured with zero, one, or more SR configuration. The PUCCH resource for LBT-SR may be configured per BWP, per TRP, per CC, per set of CCs, per CG, and/or per UE. The PUCCH resource for LBT-SR may be configured on PCell, PSCell, and/or (PUCCH) SCell. The LBT-SR may be transmitted on PCell, PSCell, and/or SCell accordingly. The LBT-SR may be transmitted in a cross-cell manner, e.g., the beam failure happens on an SCell, but the LBT-SR is transmitted on PCell. The LBT-SR configuration may be a specific configuration which is not one of the SR configurations (e.g., the ID of BFR-SR configuration is not shared with schedulingRequestid (e.g., specified in 3GPP TS 38.331 V15.7.0)) Alternatively, the LBT-SR configuration may be one of the SR configurations (e.g., the ID of LBT-SR configuration is shared with schedulingRequestid (e.g., specified in 3GPP TS 38.331 V15.7.0)) The LBT-SR may have the highest priority out of all the SR configurations. The LBT-SR configuration may be configured per BWP, per TRP, per CC, per set of CCs, per CG, and/or per UE. In one embodiment, the LBT-SR may be considered as one of the SR.

BFR-SR: The BFR-SR may be a first step of the beam failure request (BFRQ). The BFR-SR may be a dedicated SR-like PUCCH resource for BFR. The BFR-SR may be used to inform NW of a beam failure event and/or used for requesting UL-SCH resource(s) for BFR report transmission. The UL resource required by BFR-SR may (only) be used for BFR (report transmission). The UE may be configured with zero, one, or more BFR-SR configuration. The PUCCH resource for BFR-SR may be configured per BWP, per TRP, per CC, per set of CCs, per CG, and/or per UE. The PUCCH resource for BFR-SR may be configured on PCell, PSCell, and/or (PUCCH) SCell.

The BFR-SR may be transmitted on PCell, PSCell, and/or SCell accordingly. The BFR-SR may be a cross-cell transmission, e.g., the beam failure happens on an SCell, but the BFR-SR is transmitted on PCell.

The BFR-SR configuration may be a specific configuration which is not one of the SR configurations (e.g., the ID of BFR-SR configuration is not shared with schedulingRequestid (e.g., specified in 3GPP TS 38.331 V15.7.0)) Alternatively, the BFR-SR configuration may be one of the SR configurations (e.g., the ID of BFR-SR configuration is shared with schedulingRequestid (e.g., specified in 3GPP TS 38.331 V15.7.0)) The BFR-SR may have the highest priority among all the SR configurations. The BFR-SR configuration may be configured per BWP, per TRP, per CC, per set of CCs, per CG, and/or per UE. In one implementation, the BFR-SR may be considered as one of the SR.

Figure 11:
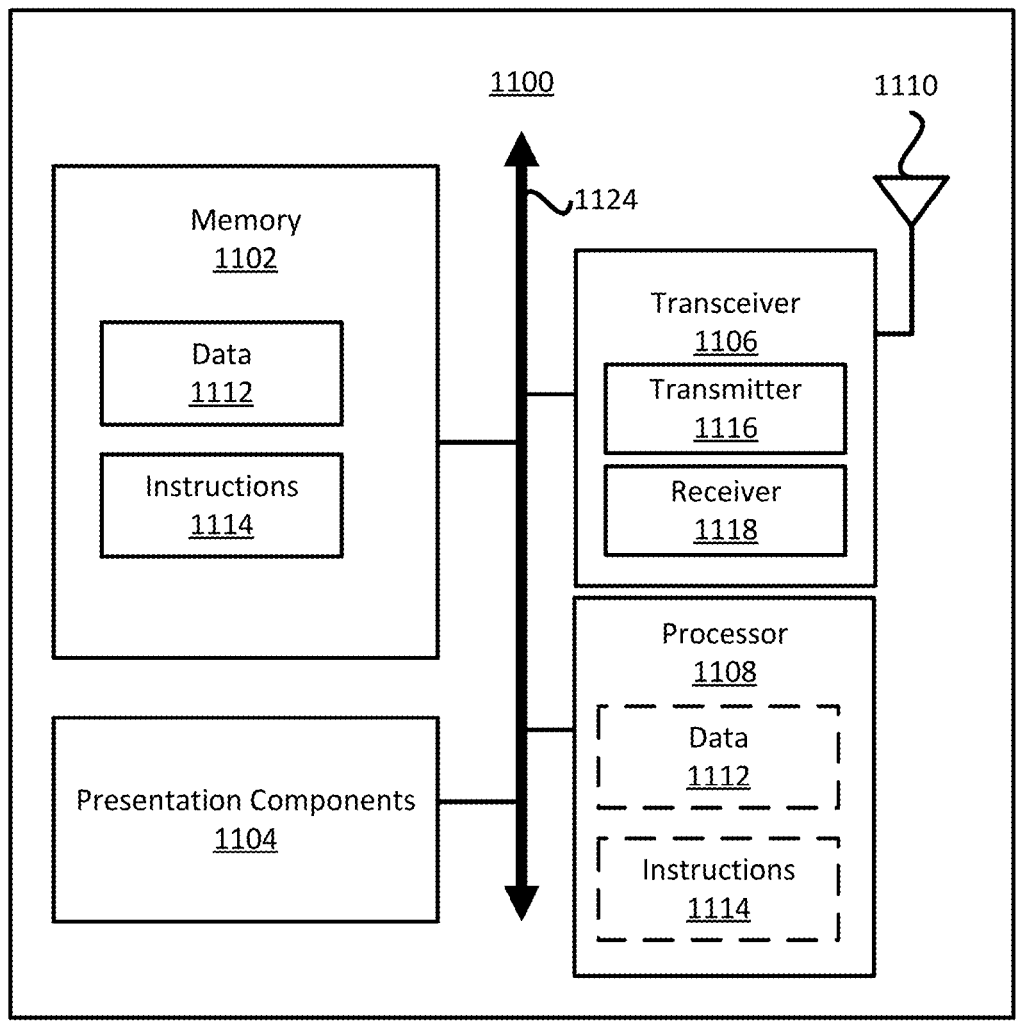
FIG. 11 illustrates a block diagram of a node for wireless communication, in accordance with various aspects of the present disclosure.

FIG. 11 illustrates a block diagram of a node 1100 for wireless communication, in accordance with various aspects of the present disclosure. As illustrated in FIG. 11, the node 1100 may include a transceiver 1106, a processor 1108, a memory 1102, one or more presentation components 1104, and at least one antenna 1110. The node 1100 may also include an RF spectrum band module, a BS communications module, a network communications module, and a system communications management module, Input/Output (I/O) ports, I/O components, and a power supply (not explicitly illustrated in FIG. 11). Each of these components may be in communication with each other, directly or indirectly, over one or more buses 1124. In one implementation, the node 1100 may be a UE or a BS that performs various functions disclosed herein, for example, with reference to FIGS. 1 through 10.

The transceiver 1106 having a transmitter 1116 (e.g., transmitting/transmission circuitry) and a receiver 1118 (e.g., receiving/reception circuitry) may be configured to transmit and/or receive time and/or frequency resource partitioning information. In one implementation, the transceiver 1106 may be configured to transmit in different types of subframes and slots, including, but not limited to, usable, non-usable and flexibly usable subframes and slot formats. The transceiver 1106 may be configured to receive data and control channels.

The node 1100 may include a variety of computer-readable media. Computer-readable media can be any available media that can be accessed by the node 1100 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 1102 may include computer storage media in the form of volatile and/or non-volatile memory. The memory 1102 may be removable, non-removable, or a combination thereof. For example, the memory 1102 may include solid-state memory, hard drives, optical-disc drives, etc. As illustrated in FIG. 11, the memory 1102 may store computer-readable and/or computer-executable instructions 1114 (e.g., software codes) that are configured to, when executed, cause the processor 1108 to perform various functions disclosed herein, for example, with reference to FIGS. 1 through 10. Alternatively, the instructions 1114 may not be directly executable by the processor 1108 but may be configured to cause the node 1100 (e.g., when compiled and executed) to perform various functions disclosed herein.

The processor 1108 (e.g., having processing circuitry) may include an intelligent hardware device, a Central Processing Unit (CPU), a microcontroller, an ASIC, etc. The processor 1108 may include memory. The processor 1108 may process the data 1112 and the instructions 1114 received from the memory 1102, and information through the transceiver 1106, the baseband communications module, and/or the network communications module. The processor 1108 may also process information to be sent to the transceiver 1106 for transmission through the antenna 1110, to the network communications module for transmission to a CN.

One or more presentation components 1104 may present data indications to a person or other devices. Examples of presentation components 1104 may include a display device, speaker, printing component, vibrating component, etc.

From the present disclosure, it is manifested that various techniques may be used for implementing the concepts disclosed in the present application without departing from the scope of those concepts. Moreover, while the concepts have been disclosed with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method performed by a User Equipment (UE) for Listen Before Talk (LBT) failure detection and recovery, the method comprising:
triggering a first consistent LBT failure procedure for a first consistent LBT failure detected on a first Bandwidth Part (BWP) of a first cell of a Base Station (BS);
triggering a second consistent LBT failure procedure for a second consistent LBT failure detected on a second BWP of a second cell of the BS;
triggering a first Scheduling Request (SR) procedure for the first consistent LBT failure detected on the first BWP;
triggering a second SR procedure for the second consistent LBT failure detected on the second BWP;
receiving, from the BS, an indication for BWP switching of the first cell;
switching an active BWP of the first cell based on the indication;
canceling the first consistent LBT failure procedure, without canceling the second consistent LBT failure procedure, in response to receiving the indication; and
canceling the first SR procedure, without canceling the second SR procedure, in response to receiving the indication.

2. The method of claim 1, further comprising:
in a case that the first consistent LBT failure procedure and the first SR procedure have not been canceled, canceling the first consistent LBT failure procedure and canceling the second consistent LBT failure procedure when the UE transmits an LBT failure Medium Access Control (MAC) Control Element (CE) to the BS, the LBT failure MAC CE indicating a first index of the first cell and a second index of the second cell; and
canceling the first SR procedure and canceling the second SR procedure when the UE transmits the LBT failure MAC CE to the BS.

3. The method of claim 1, further comprising:
deactivating the second cell when at least one of a plurality of conditions is fulfilled;
canceling the second consistent LBT failure procedure in response to deactivating the second cell; and
canceling the second SR procedure in response to deactivating the second cell,
wherein the plurality of conditions comprises at least one of:
a Secondary Cell (SCell) Activation/Deactivation Medium Access Control (MAC) Control Element (CE) for deactivating the second cell being received from the BS, or
expiration of an SCell deactivation timer configured for the second cell.

4. The method of claim 1, further comprising:
receiving, from the BS, a Radio Resource Control (RRC) message for reconfiguring an LBT failure recovery configuration of the second cell;
canceling the second consistent LBT failure procedure in response to receiving the RRC message; and
canceling the second SR procedure in response to receiving the RRC message.

5. The method of claim 1, wherein the indication is received on a Physical Downlink Control Channel (PDCCH) or via Radio Resource Control (RRC) signaling.

6. The method of claim 1, wherein at least one of the first SR procedure and the second SR procedure is triggered when at least one of a plurality of conditions is fulfilled, the plurality of conditions comprising at least one of:
no Uplink Shared Channel (UL-SCH) resource being available for a new transmission, and
as a result of logical channel prioritization, an UL-SCH resource allocated to the UE not being able to accommodate an LBT failure Medium Access Control (MAC) Control Element (CE) and a sub-header of the LBT failure MAC CE.

7. The method of claim 1, further comprising:
after canceling the first consistent LBT failure procedure and the first SR procedure, performing operations including:
transmitting, to the BS, an SR for the second consistent LBT failure on a Physical Uplink Control Channel (PUCCH) resource to request an Uplink Shared Channel (UL-SCH) resource; and
transmitting, to the BS, an LBT failure Medium Access Control (MAC) Control Element (CE) via the UL-SCH resource after the UL-SCH resource is allocated to the UE, the LBT failure MAC CE indicating a second index of the second cell and not indicating a first index of the first cell.

8. The method of claim 1, further comprising:
initiating a Random Access (RA) procedure on a Special Cell (SpCell) in a case that the UE is not configured with any valid Physical Uplink Control Channel (PUCCH) resource for the second SR procedure; and
canceling the second SR procedure after initiating the RA procedure.

9. The method of claim 1, wherein the first BWP and the second BWP are Uplink (UL) BWPs, and the active BWP is one of a Downlink (DL) BWP and an UL BWP.

10. The method of claim 1, wherein the first cell and the second cell are Secondary Cells (SCells).

11. A User Equipment (UE) for Listen Before Talk (LBT) failure detection and recovery, the UE comprising:
a memory storing one or more instructions; and
at least one processor coupled to the memory, the at least one processor being configured to execute the instructions to:
trigger a first consistent LBT failure procedure for a first consistent LBT failure detected on a first Bandwidth Part (BWP) of a first cell of a Base Station (BS);
trigger a second consistent LBT failure procedure for a second consistent LBT failure detected on a second BWP of a second cell of the BS;
trigger a first Scheduling Request (SR) procedure for the first consistent LBT failure detected on the first BWP;
trigger a second SR procedure for the second consistent LBT failure detected on the second BWP;
receive, from the BS, an indication for BWP switching of the first cell;
switch an active BWP of the first cell based on the indication;
cancel the first consistent LBT failure procedure, without canceling the second consistent LBT failure procedure, in response to receiving the indication; and
cancel the first SR procedure, without canceling the second SR procedure, in response to receiving the indication.

12. The UE of claim 11, wherein the at least one processor is further configured to execute the instructions to:
in a case that the first consistent LBT failure procedure and the first SR procedure have not been canceled, cancel the first consistent LBT failure procedure and cancel the second consistent LBT failure procedure when the UE transmits an LBT failure Medium Access Control (MAC) Control Element (CE) to the BS, the LBT failure MAC CE indicating a first index of the first cell and a second index of the second cell; and cancel the first SR procedure and cancel the second SR procedure when the UE transmits the LBT failure MAC CE to the BS.

13. The UE of claim 11, wherein the at least one processor is further configured to execute the instructions to:

deactivate the second cell when at least one of a plurality of conditions is fulfilled;

cancel the second consistent LBT failure procedure in response to deactivating the second cell; and cancel the second SR procedure in response to deactivating the second cell, wherein the plurality of conditions comprises at least one of:

a Secondary Cell (SCell) Activation/Deactivation Medium Access Control (MAC) Control Element (CE) for deactivating the second cell being received from the BS, or expiration of a SCell deactivation timer configured for the second cell.

14. The UE of claim 11, wherein the at least one processor is further configured to execute the instructions to:

receive, from the BS, a Radio Resource Control (RRC) message for reconfiguring an LBT failure recovery configuration of the second cell;

cancel the second consistent LBT failure procedure in response to receiving the RRC message; and cancel the second SR procedure in response to receiving the RRC message.

15. The UE of claim 11, wherein the indication is received on a Physical Downlink Control Channel (PDCCH) or via Radio Resource Control (RRC) signaling.

16. The UE of claim 11, wherein at least one of the first SR procedure and the second SR procedure is triggered when at least one of a plurality of conditions is fulfilled, the plurality of conditions comprising at least one of:

no Uplink Shared Channel (UL-SCH) resource being available for a new transmission, and as a result of logical channel prioritization, an UL-SCH resource allocated to the UE not being able to accommodate an LBT failure Medium Access Control (MAC) Control Element (CE) and a sub-header of the LBT failure MAC CE.

17. The UE of claim 11, wherein the at least one processor is further configured to execute the instructions to:

after canceling the first consistent LBT failure procedure and the first SR procedure, perform operations including:

transmitting, to the BS, an SR for the second consistent LBT failure on a Physical Uplink Control Channel (PUCCH) resource to request an Uplink Shared Channel (UL-SCH) resource; and transmitting, to the BS, an LBT failure Medium Access Control (MAC) Control Element (CE) via the UL-SCH resource after the UL-SCH resource is allocated to the UE, the LBT failure MAC CE indicating a second index of the second cell and not indicating a first index of the first cell.

18. The UE of claim 11, wherein the at least one processor is further configured to execute the instructions to:

initiate a Random Access (RA) procedure on a Special Cell (SpCell) in a case that the UE is not configured with any valid Physical Uplink Control Channel (PUCCH) resource for the second SR procedure; and cancel the second SR procedure after initiating the RA procedure.

19. The UE of claim 11, wherein the first BWP and the second BWP are Uplink (UL) BWPs, and the active BWP is one of a Downlink (DL) BWP and an UP BWP.

20. The UE of claim 11, wherein the first cell and the second cell are Secondary Cells (SCells).

* * * * *